United States Patent
Yamada et al.

(10) Patent No.: US 7,978,596 B2
(45) Date of Patent: Jul. 12, 2011

(54) CONNECTION-ORIENTED NETWORK NODE

(75) Inventors: Akiko Yamada, Kawasaki (JP); Masaya Oda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 913 days.

(21) Appl. No.: 11/297,246

(22) Filed: Dec. 8, 2005

(65) Prior Publication Data

US 2007/0036073 A1 Feb. 15, 2007

(30) Foreign Application Priority Data

Aug. 11, 2005 (JP) .................................. 2005-233671

(51) Int. Cl.
*H04L 12/26* (2006.01)
*H04J 3/14* (2006.01)
(52) U.S. Cl. ......... 370/217; 370/225; 370/242; 370/252
(58) Field of Classification Search .................. 370/225, 370/216, 242, 227–228, 468, 395.21, 217, 370/252, 315, 21; 709/239
See application file for complete search history.

(56) References Cited

U.S. PATENT DOCUMENTS

| | | | |
|---|---|---|---|
| 6,859,431 B1 * | 2/2005 | Tedijanto et al. | 370/223 |
| 7,075,889 B2 * | 7/2006 | Shiozawa | 370/228 |
| 7,124,187 B1 * | 10/2006 | Kodialam et al. | 709/226 |
| 7,248,561 B2 * | 7/2007 | Ishibashi et al. | 370/228 |
| 7,406,032 B2 * | 7/2008 | Li et al. | 370/217 |
| 7,468,944 B2 * | 12/2008 | Nishioka et al. | 370/225 |
| 2002/0138645 A1 * | 9/2002 | Shinomiya et al. | 709/238 |
| 2002/0172149 A1 * | 11/2002 | Kinoshita et al. | 370/216 |
| 2003/0095500 A1 * | 5/2003 | Cao | 370/216 |
| 2003/0152024 A1 * | 8/2003 | Yang et al. | 370/216 |
| 2004/0052207 A1 * | 3/2004 | Charny et al. | 370/216 |
| 2004/0205238 A1 * | 10/2004 | Doshi et al. | 709/241 |
| 2005/0259586 A1 * | 11/2005 | Hafid et al. | 370/241 |
| 2005/0276215 A1 * | 12/2005 | Kitani et al. | 370/217 |
| 2006/0203720 A1 * | 9/2006 | Kano | 370/228 |

FOREIGN PATENT DOCUMENTS

| | | |
|---|---|---|
| JP | 2003-115872 | 4/2003 |
| JP | 2004-040384 | 2/2004 |

OTHER PUBLICATIONS

Ben Wright. Inter-Area Routing, Path Selection and Traffic Engineering How to meet Quality of Service requirements for traffic routed across MPLS and optical network boundaries, Version 1, Nov. 2003.

* cited by examiner

*Primary Examiner* — Kwang B Yao
*Assistant Examiner* — Candal Elpenord
(74) *Attorney, Agent, or Firm* — Fujitsu Patent Center

(57) ABSTRACT

A connection-oriented network node capable of becoming an originating node of a protection path serving as a bypath of a protection segment included in a working path in a network system in which data is transferred via a path previously set up between nodes, comprises a usage bandwidth determining unit determining, when setting up the protection path, a usage bandwidth of the setup target protection path on the basis of a working path including the protection segment to be protected by the setup target protection path, and a generation unit generating, if a value obtained by adding the determined usage bandwidth to a current protection path usage bandwidth of an interface transmitting data that is forwarded on the setup target protection path, does not exceed a usable bandwidth for the protection path that is preset with respect to the interface, a signaling message for setting up the setup target protection path to send this message.

12 Claims, 24 Drawing Sheets

FIG. 3A

| ITEM | ENTRY 1 | ENTRY 2 |
|---|---|---|
| PROTECTION PATH ID | PROTECTION PATH 0 | PROTECTION PATH 1 |
| DESIGNATION OF PROTECTION SEGMENT | DESIGNATED | DESIGNATED |
| PROTECTION SEGMENT | IP_E-IP_B-IP_F-IP_G | IP_A-IP_B-IP_C-IP_D |
| USAGE BANDWIDTH | 10Mbps | 30Mbps |
| PROTECTION TARGET WORKING PATH ID | WORKING PATH 0 | WORKING PATH 1 |
| MONITORING PATH ID | MONITORING PATH 0 | MONITORING PATH 1 |

| ITEM | ENTRY 1 | ENTRY 2 | ENTRY 3 |
|---|---|---|---|
| WORKING PATH ID | WORKING PATH 0 | WORKING PATH 1 | WORKING PATH 2 |
| ROUTE INFORMATION | IP_X0-IP_E-IP_B-IP_F-IP_G-IP_Z0 | IP_X1-IP_A-IP_B-IP_C-IP_D-IP_Z1 | IP_X2-IP_H-IP_I-IP_J-IP_Z2 |
| BANDWIDTH INFORMATION | 10Mbps | 30Mbps | 20Mbps |

| ITEM | ENTRY 1 | ENTRY 2 |
|---|---|---|
| PROTECTION PATH ID | PROTECTION PATH 1 | PROTECTION PATH 0 |
| ROUTE INFORMATION | IP_A-IP_K-IP_L-IP_D | IP_E-IP_A-IP_K-IP_L-IP_D-IP_G |
| BANDWIDTH INFORMATION | 30Mbps | 10Mbps |

| ITEM | ENTRY 1 | ENTRY 2 |
|---|---|---|
| MONITORING PATH ID | MONITORING PATH 1 | MONITORING PATH 0 |
| ROUTE INFORMATION | IP_A-IP_B-IP_C-IP_D | IP_E-IP_B-IP_F-IP_G |
| BANDWIDTH INFORMATION | — | — |

| | IP_C | IP_B | IP_F | MAXIMUM |
|---|---|---|---|---|
| PROTECTION PATH 0 | | 10 | 10 | |
| PROTECTION PATH 1 | 30 | 30 | | |
| TOTAL | 30 | 40 | 10 | 40 |

| | IP_A-IP_B | IP_B-IP_C | IP_C-IP_D | IP_E-IP_B | IP_B-IP_F | IP_F-IP_G | MAXIMUM |
|---|---|---|---|---|---|---|---|
| PROTECTION PATH 0 | | | | 10 | 10 | 10 | |
| PROTECTION PATH 1 | 30 | 30 | 30 | | | | |
| TOTAL | 30 | 30 | 30 | 10 | 10 | 10 | 30 |

| | IP_C | IP_B | IP_F | IP_I | MAXIMUM |
|---|---|---|---|---|---|
| PROTECTION PATH 0 | 30 | 10 | | | |
| PROTECTION PATH 1 | | 30 | 10 | | |
| PROTECTION PATH 2 | | | | 20 | |
| TOTAL | 30 | 40 | 10 | 20 | 40 |

| | IP_A-IP_B | IP_B-IP_C | IP_C-IP_D | IP_E-IP_B | IP_B-IP_F | IP_F-IP_G | IP_H-IP_I | IP_I-IP_J | MAXIMUM |
|---|---|---|---|---|---|---|---|---|---|
| PROTECTION PATH 0 | 30 | 30 | | | 10 | 10 | | | |
| PROTECTION PATH 1 | | 30 | 30 | 10 | 10 | 10 | | | |
| PROTECTION PATH 2 | | | | | | | 20 | 20 | |
| TOTAL | 30 | 30 | 30 | 10 | 10 | 10 | 20 | 20 | 30 |

FIG. 20A (35)

| ITEM | ENTRY 1 | ENTRY 2 | ENTRY 3 |
|---|---|---|---|
| PROTECTION PATH ID | PROTECTION PATH 0 | PROTECTION PATH 1 | PROTECTION PATH 2 |
| DESIGNATION OF PROTECTION SEGMENT | DESIGNATED | DESIGNATED | UNDESIGNATED |
| PROTECTION SEGMENT | IP_E-IP_B-IP_F-IP_G | IP_A-IP_B-IP_C-IP_D | IP_H-IP_I-IP_J |
| USAGE BANDWIDTH | 10Mbps | 30Mbps | 45Mbps |
| PROTECTION TARGET WORKING PATH ID | WORKING PATH 0 | WORKING PATH 1 | WORKING PATH 2, WORKING PATH 3 |
| MONITORING PATH ID | MONITORING PATH 0 | MONITORING PATH 1 | MONITORING PATH 2 |

FIG. 20B (44)

| ITEM | ENTRY 1 | ENTRY 2 | ENTRY 3 | ENTRY 4 |
|---|---|---|---|---|
| WORKING PATH ID | WORKING PATH 0 | WORKING PATH 1 | WORKING PATH 2 | WORKING PATH 3 |
| ROUTE INFORMATION | IP_X0-IP_E-IP_B-IP_F-IP_G-IP_Z0 | IP_X1-IP_A-IP_B-IP_C-IP_D-IP_Z1 | IP_X2-IP_H-IP_I-IP_J-IP_Z2 | IP_X3-IP_H-IP_I-IP_J-IP_Z3 |
| BANDWIDTH INFORMATION | 10Mbps | 30Mbps | 20Mbps | 25Mbps |

FIG. 20C (45)

| ITEM | ENTRY 1 | ENTRY 2 | ENTRY 3 |
|---|---|---|---|
| PROTECTION PATH ID | PROTECTION PATH 0 | PROTECTION PATH 1 | PROTECTION PATH 2 |
| ROUTE INFORMATION | IP_E-IP_A-IP_K-IP_L-IP_D-IP_G | IP_A-IP_K-IP_L-IP_D | IP_H-IP_K-IP_L-IP_J |
| BANDWIDTH INFORMATION | 10Mbps | 30Mbps | 45Mbps |

FIG. 20D (46)

| ITEM | ENTRY 1 | ENTRY 2 | ENTRY 3 |
|---|---|---|---|
| MONITORING PATH ID | MONITORING PATH 0 | MONITORING PATH 1 | MONITORING PATH 2 |
| ROUTE INFORMATION | IP_E-IP_B-IP_F-IP_G | IP_A-IP_B-IP_C-IP_D | IP_H-IP_I-IP_J |
| BANDWIDTH INFORMATION | — | — | — |

|  | IP_C | IP_B | IP_F | IP_I | MAXIMUM |
|---|---|---|---|---|---|
| PROTECTION PATH 0 |  | 10 | 10 |  |  |
| PROTECTION PATH 1 | 30 | 30 |  |  |  |
| PROTECTION PATH 2 |  |  |  | 45 |  |
| TOTAL | 30 | 40 |  | 45 | 45 |

|  | IP_A-IP_B | IP_B-IP_C | IP_C-IP_D | IP_E-IP_B | IP_B-IP_F | IP_F-IP_G | IP_H-IP_I | IP_I-IP_J | MAXIMUM |
|---|---|---|---|---|---|---|---|---|---|
| PROTECTION PATH 0 |  |  |  | 10 | 10 | 10 |  |  |  |
| PROTECTION PATH 1 | 30 | 30 | 30 |  |  |  |  |  |  |
| PROTECTION PATH 2 |  |  |  |  |  |  | 45 | 45 |  |
| TOTAL | 30 | 30 | 30 | 10 | 10 | 10 | 45 | 45 | 45 |

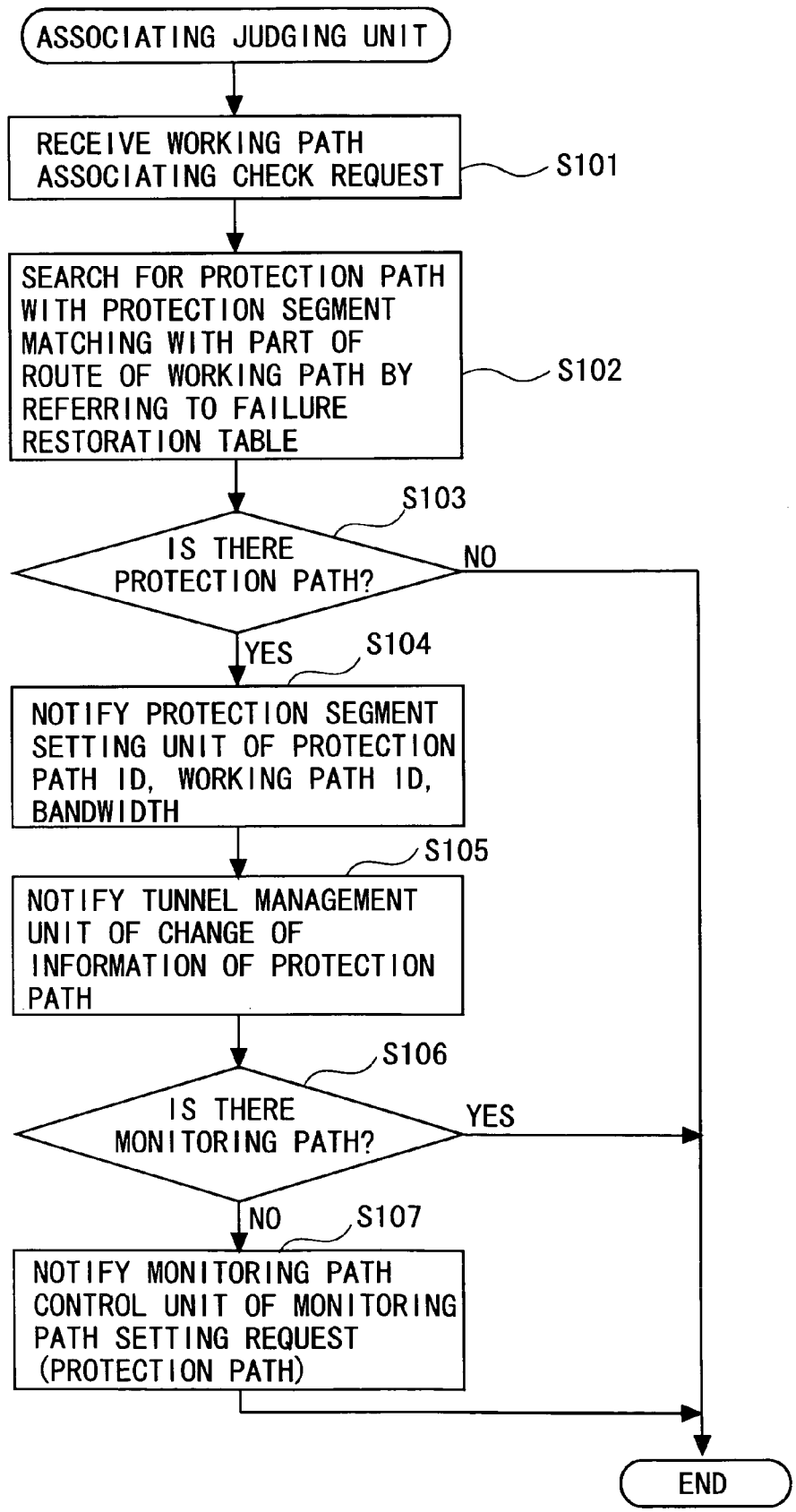

CONNECTION-ORIENTED NETWORK NODE

BACKGROUND OF THE INVENTION

1. Field of the Invention

The invention relates to a connection-oriented network node. For example, the invention relates to a technology for rerouting a failure point while assuring a bandwidth when a failure occurs in a connection-oriented network such as a label forwarding network (MPLS (Multi-Protocol Label Switching)) for forwarding data in a way that attaches a label to a packet.

2. Description of the Related Art

A conventional method is exemplified such as Fast Rerouting (Internet Draft: draft-ietf-mpls-rsvp-lsp-fastreroute-07.txt) that is being examined by IETF (Internet Engineering Task Force). In this technology, a protection path rerouting the failure point is previously set up on the assumption of node/link failures. If the failure occurs, a failure detecting node promptly switches over the traffic on a working path passing the failure point to the protection path for rerouting the failure point. With this contrivance, the traffic can be restored from the failure at a high speed.

As to the link failure, however, it is requested that the protection path is set up for on a link-by-link basis (per link). Therefore, if a network is scaled up, the number of the protection paths rises. Herein, if communication qualities (Quality of Service (QoS)) are considered about the network, it is required preparation of enormous spare resources.

In this respect, SRLG (Shared Risk Link Group) is exemplified as a method of sharing the standby resources. This method is that network resources (i.e., nodes and links) having a possibility of suffering simultaneous occurrence of failures are distinguished, and the protection paths different in terms of the SRLG of the network resources to be protected shall share the bandwidths. This scheme enables the standby resources to be reduced.

Non-Patent document 1 describes a brief concept of the SRLG. This document discloses the following. Even when employing two different logical links in a certain network and when these links employ the same physical line, if a failure occurs in the physical line, both of the logical links suffer the failure. Therefore, it is recognized by the SRLG whether the simultaneous failure might occur or not.

Further, "Bandwidth Management Method for Supporting Standby Bandwidth Shared Protection in Mesh Network" disclosed in Patent document 1 is given as a method that actualizes sharing the bandwidths by assigning (applying) the SRLG.

[Patent document 1] Japanese Patent Application Laid-Open Publication No. 2003-115872
[Patent document 2] Japanese Patent Application Laid-Open Publication No. 2004-40384
[Non-Patent document 1] "INTER-AREA ROUTING, PATH SELECTION AND TRAFFIC ENGINEERING", Version 1, Ben Wright, Internet, November, 2003, http://www-.dataconnection.com/network/download/whitepapers/interarea.pdf"

The prior art using the SRLG described above includes a problem that the operation becomes complicated. Namely, in the prior art, for actualizing the bandwidth sharing, even in a case where it is recognized that each of the logical links on the network is explicitly configured by a different physical link, an identifier named SRLG must be assigned to all the network resources in order to actualize the bandwidth sharing.

Further, execution of the failure restoration involves performing setup of the working path, setup of the protection path for bypassing the failure point and setup of the working path to be protected by the protection path.

Moreover, in the case of adopting a method of bypassing the failure in every segment consisting of a plurality of consecutive nodes and links, such a scheme is required that an error in a protection section (segment) is detected by an originating (head-end) node (i.e., a switching node for switching over (bypassing) the working path to the protection path when the failure occurs, and there might be a case of representing this switching node also as "PLR: Point of Local Repair") of the protection path. For instance, it is considered to adopt such a method of setting up a monitoring path in the segment and, as triggered by a failure in the monitoring path, notifying the PLR of this failure.

For actualizing this scheme, however, the working path, the protection path and the monitoring path are set up respectively and are required to be associated with each other. At this time, further, a requirement is to pay attention so that the monitoring path is coincident with the segment.

As a matter of fact, in the case of configuring a network robust against a physical failure, it is sufficiently considered to select a different physical link at a designing stage so as not to stop the communications with a plurality of local areas due to one failure point.

SUMMARY OF THE INVENTION

It is an object of the invention to provide a technology capable of efficiently setting up a protection path and a monitoring path.

Further, it is another object of the invention to provide a technology capable of actualizing failure restoration taking account of bandwidth sharing among protection paths without inputting fine settings of the protection paths and the monitoring paths in each of the nodes located on the paths on the network.

The invention adopts the following configurations in order to solve the problems given above.

Namely, the invention is a connection-oriented network node of the invention capable of becoming an originating node of a protection path serving as a by path of a protection segment included in a working path in a network system in which data is transferred via a path previously established between nodes, the network node comprising:

a working path information storage unit stored with information about a working path extending via the network node itself;

a failure restoration information storage unit stored with such information that a protection path is associated with the working path having the protection segment to be protected by this protection path;

a failure restoration processing unit retrieving information of one or more working paths including the protection segment protected by a setup target protection path to be set up based on a command for setting up the protection path from the working path information storage unit, and registering, in the failure restoration information storage unit, the retrieved working path information and the setup target protection path information that contains a protection segment and a usage bandwidth in a way that associates these items of information with each other;

an interface information storage unit stored with, per protection path, bandwidths required of nodes and links protected by the protection path with respect to the interface transmitting data that is forwarded on the protection path;

a bandwidth management unit, with respect to the protection nodes and the protection links included in the protection segment to be protected by the setup target protection path, recording usage bandwidths of the setup target protection path in the interface information storage unit, calculating a total value of the usage bandwidths of each protection path related to the protection nodes and protection links, which are registered in the interface information storage unit, and judging whether or not a maximum value in the calculated total value exceeds a usable bandwidth for the protection path that is preset with respect to the interface; and a message processing unit generating, when it is judged that the maximum value does not exceed the usable bandwidth, a signaling message for setting up the setup target protection path to notify of this message each of the nodes located on the setup target protection path.

In the invention, it is preferable to configure so that the failure restoration processing unit, if the protection segment of the setup target protection path is designated by the command, retrieves the information about all the working paths each having a route including this protection segment from the working path information storage unit.

Further, in the invention, it is preferable to configure so that the failure restoration processing unit, if the protection segment of the setup target protection path is not designated by the command, retrieves the information about the working path passing an originating node and a terminating node of the setup target protection path and having a route that does not overlap with the protection path from the working path information storage unit, and determining, as the protection segment, a segment on a route of the retrieved working path, which exists between the originating node and the terminating node of the setup target protection path.

Still further, in the invention, it is preferable to configure so that the failure restoration processing unit retrieves a total value of the usage bandwidths of the one or more working paths to determine a usage bandwidth of the setup target protection path.

Yet further, in the invention, it is preferable to configure so that the failure restoration processing unit, if the protection path is set up through sending the signaling message, retrieves the protection segment of the protection path from the failure restoration information storage unit for, and the message processing unit generates a signaling message for setting up a monitoring path corresponding to the retrieved protection segment in order to notify of the signaling message each of the nodes located on the monitoring path.

Moreover, in the invention, it is preferable to configure so that the failure restoration processing unit, when receiving the signaling message for setting up the working path passing the network node itself, retrieves the protection path having the protection segment included in a route of the setup target working path that is contained in the signaling message from the failure restoration information storage unit, and rewrites the usage bandwidth stored on the failure restoration information storage unit with respect to the retrieved protection path into a value obtained by adding the usage bandwidth of the setup target working path that is contained in the signaling message to the stored usage bandwidth, and the message processing unit generates and sends a signaling message for setting up the protection path having the rewritten usage bandwidth.

Yet moreover, the invention is a connection-oriented network node receiving a signaling message for setting up a protection path serving as a bypath of a protection segment included in a working path in a network system in which data is transferred via a path previously established between nodes, the network node comprising:

a receiving unit receiving the signaling message;

an extraction unit extracting a usage bandwidth of a setup target protection path and a protection segment thereof that are contained in the signaling message;

an interface information storage unit stored with, per protection path, the bandwidth of the protection path for each of protection nodes and each of protection links that are protected by the protection path with respect to the interface transmitting data that is forwarded on the protection path;

a judging unit registering, in the interface information storage unit, the extracted usage bandwidth with respect to the protection node and the protection link included in the extracted protection segment, calculating a total value of the usage bandwidths for the respective protection nodes and the respective protection links that are registered in the interface information storage unit, and judging whether or not a maximum value in the calculated total value(s) exceeds a usable bandwidth for the protection path, which is preset for the interface; and an output unit outputting, when the maximum value exceeds the usable bandwidth, an error in the signaling for setting up the setup target protection path.

Still moreover, the invention is a connection-oriented network node capable of becoming an originating node of a protection path serving as a bypath of a protection segment included in a working path in a network system in which data is transferred via a path previously set up between nodes, the network node comprising:

a usage bandwidth determining unit determining, when setting up the protection path, a usage bandwidth of the setup target protection path on the basis of a working path including the protection segment to be protected by the setup target protection path; and a generation unit generating, if a value obtained by adding the determined usage bandwidth to a present protection path usage bandwidth of an interface transmitting data that is forwarded on the setup target protection path, does not exceed a usable bandwidth for the protection path that is preset with respect to the interface, a signaling message for setting up the setup target protection path in order to send this message.

In the invention, it is preferable to configure so that the generation unit, when a setup of a new working path is detected and if a protection path, which an originating node of this protection path is the network node itself, having a protection segment included in a route of the new working path has already been set up, generates a protection path setup signaling message for containing the usage bandwidth of the new working path in a usage bandwidth of the already-setup protection path.

Furthermore, the invention is a connection-oriented network node capable of becoming an originating node of a protection path serving as a bypath of a protection segment included in a working path in a network system in which data is transferred via a path previously established between nodes, the network node comprising:

a specifying unit specifying, based on the protection segment of the setup target protection path that is contained in the signaling message, an interface from which to forward data that should be transferred along on the setup target protection path; and a judging unit outputting, if a value obtained by adding a current protection path usage bandwidth of the specified interface to the usage bandwidth of the setup target protection path that is contained in the signaling message, exceeds a usable bandwidth for the protection path that is preset with respect to the interface, an error in the signaling for the setup target protection path.

It should be noted that the invention can be specified as the inventions of a method and a program each having the same features of the node described above and of a recording medium recorded with this program.

According to the invention, it is possible to efficiently set up the protection path and the monitoring path for the working path.

Further, according to the invention, it is feasible to actualize the failure restoration taking account of the bandwidth sharing among the protection paths without inputting the fine settings of the protection paths and the monitoring path in each of the nodes located on the paths on the network.

BRIEF DESCRIPTION OF THE DRAWINGS

FIG. 3A is a diagram showing an example of a data structure of a failure restoration table, and showing storage contents in an operational example 1;

FIG. 3B is a diagram showing an example of a data structure of a working path information table, and showing storage contents in the operational example 1;

FIG. 3C is a diagram showing an example of a data structure of a protection path information table, and showing storage contents in the operational example 1;

FIG. 3D is a diagram showing an example of a data structure of a monitoring path information table, and showing storage contents in the operational example 1;

FIG. 4A is a diagram showing an example of a data structure of a node failure table stored in an interface DB, and showing storage contents in the operational example 1;

FIG. 4B is a diagram showing an example of a data structure of a link failure table stored in the interface DB, and showing storage contents in the operational example 1;

FIG. 16A is a diagram showing contents stored in a node failure table within the interface DB to which the via-node of the protection path refers in the operational example 3;

FIG. 16B is a diagram showing contents stored in a link failure table within the interface DB to which the via-node of the protection path refers in the operational example 3;

FIG. 20A shows contents stored in the failure restoration table to which the head-end node of the protection path refers in the operational example 4;

FIG. 20B shows contents stored in the working path information table to which the head-end node of the protection path refers in the operational example 4;

FIG. 20C shows contents stored in the protection path information table to which the head-end node of the protection path refers in the operational example 4;

FIG. 20D shows contents stored in the monitoring path information table to which the head-end node of the protection path refers in the operational example 4;

FIG. 21A shows contents stored in the node failure table stored in the interface DB to which the head-end node of the protection path refers in the operational example 4;

FIG. 21B shows contents stored in the link failure table stored in the interface DB to which the head-end node of the protection path refers in the operational example 4; and FIG. 22 is a flowchart showing a working path associating check process executed by the head-end node of the protection path in the operational example 4.

DETAILED DESCRIPTION OF THE PREFERRED EMBODIMENT

An embodiment of the invention will hereinafter be described with reference to the drawings. The following configuration of the embodiment is an exemplification, and the invention is not limited to the configuration of the embodiment.

<Network Architecture>

Figure 1:
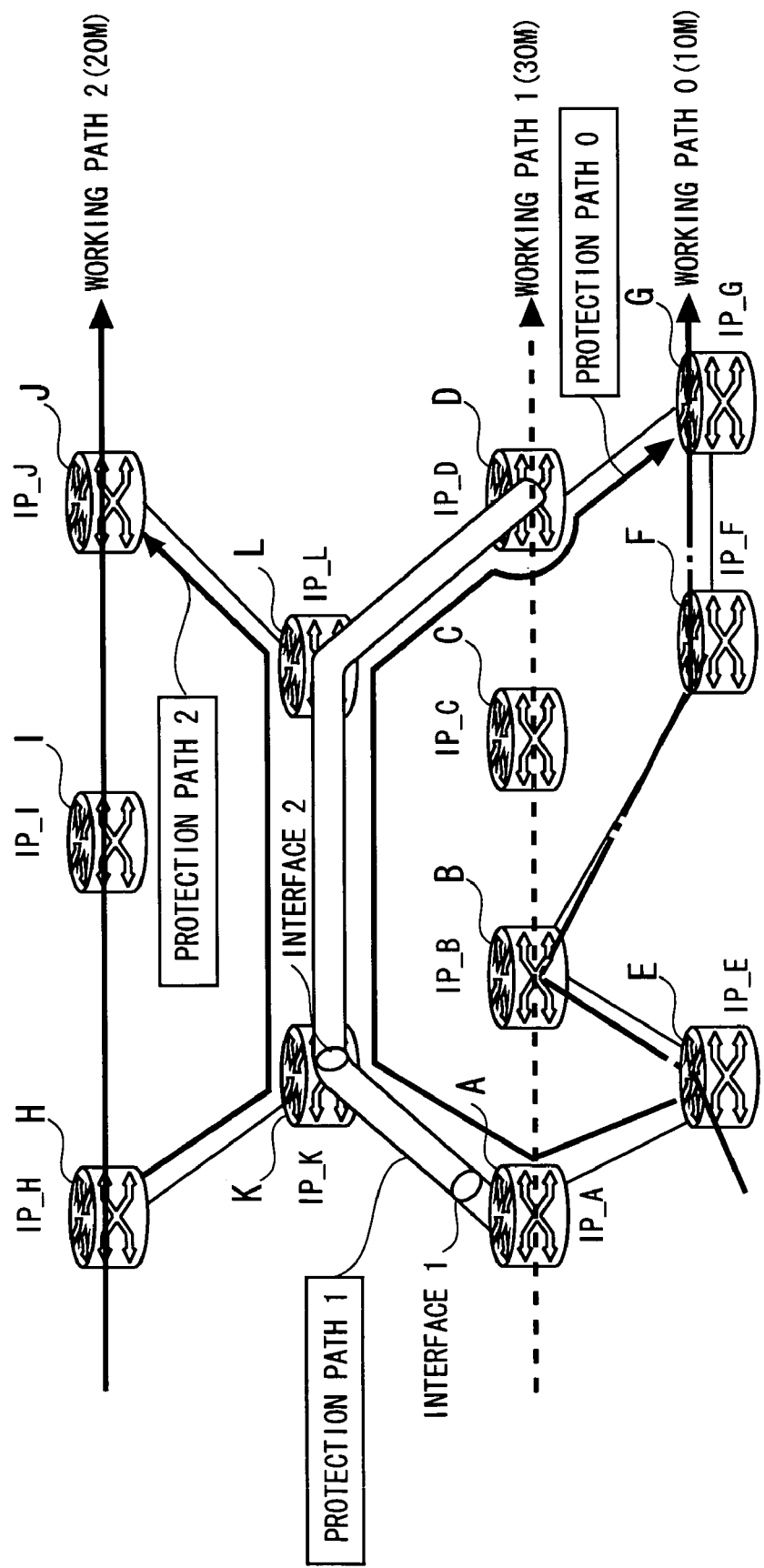
FIG. 1 is a view showing an example of network architecture in an embodiment of the invention, and also showing a working path and a protection path to be explained in an operational example 1.

FIG. 1 is a view showing an example of network architecture in the embodiment. FIG. 1 shows a connection-oriented network (network system) in which a plurality of nodes (twelve pieces of nodes A-L) are provided. Respective nodes A-L have their representative addresses such as IP_A through IP_L.

This network presets a path (which is called an LSP (Label Switched Path) in MPLS) through which a data packet (e.g., an IP packet) flows across the network by use of label switching technology such as the MPLS. Each node is called an LSR (Label Switching Router)

A path identifier called a label is attached to each data packet flowing on the path. Each of the nodes on the path refers to the label attached to the data packet and forwards the data packet to an output (egress) path (interface) associated with this label. With this labeling, the data packet can be explicitly transmitted along an optimum route. This type of path (LSP) is called a tunnel (LSP tunnel).

The paths set on the network include a working path employed at a normal time, a protection path (which is a path used for bypassing a failure point when a failure occurs) used when the failure occurs on the working path, and a monitoring path for monitoring the whole or part of section (protection section (segment)) of the working path that is protected by the protection path.

An assumption is that working paths 0, 1 and 2 are set on the network illustrated in FIG. 1. The working path 0 passes through a node E, a node B, a node F and a node G. On the working path 0, traffic (data packet) flows from the node E to the node G.

The working path 1 has a route passing through a node A, the node B, a node C and a node D. On the working path 1, the traffic flows from the node A to the node D. The working path 2 has a route passing through a node H, a node I and a node J. On the working path 2, the traffic flows from the node H to the node J. The working path 0 has a 10 Mbps bandwidth. The working path 1 has a 30 Mbps bandwidth. The working path 2 has a 20 Mbps bandwidth.

Further, on the network shown in FIG. 1, a protection path 0 for protecting the working path 0 is set. The protection path 0 has a route extending such as the node E→the node A→the node K→the node L→the node D→node along which the traffic flows. The protection path 0 is used for, if the failure occurs on the route of the working path 0, sending the data packet from the node E to the node G.

<Configuration of Node>

Figure 2A:
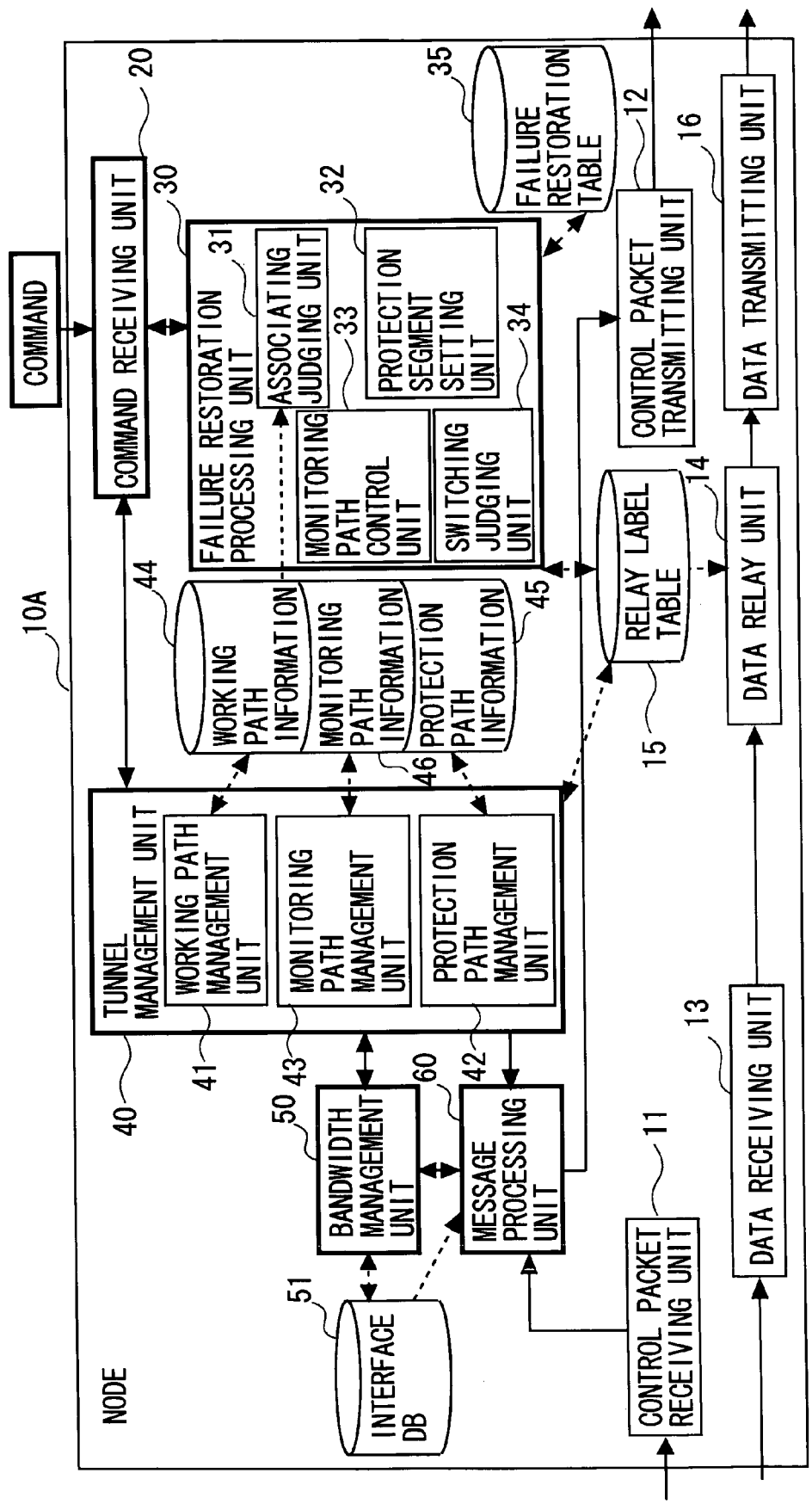
FIG. 2A is a diagram showing an example of a configuration possessed by a node becoming a head-end node of a protection path on the network shown in FIG. 1.
Figure 2B:
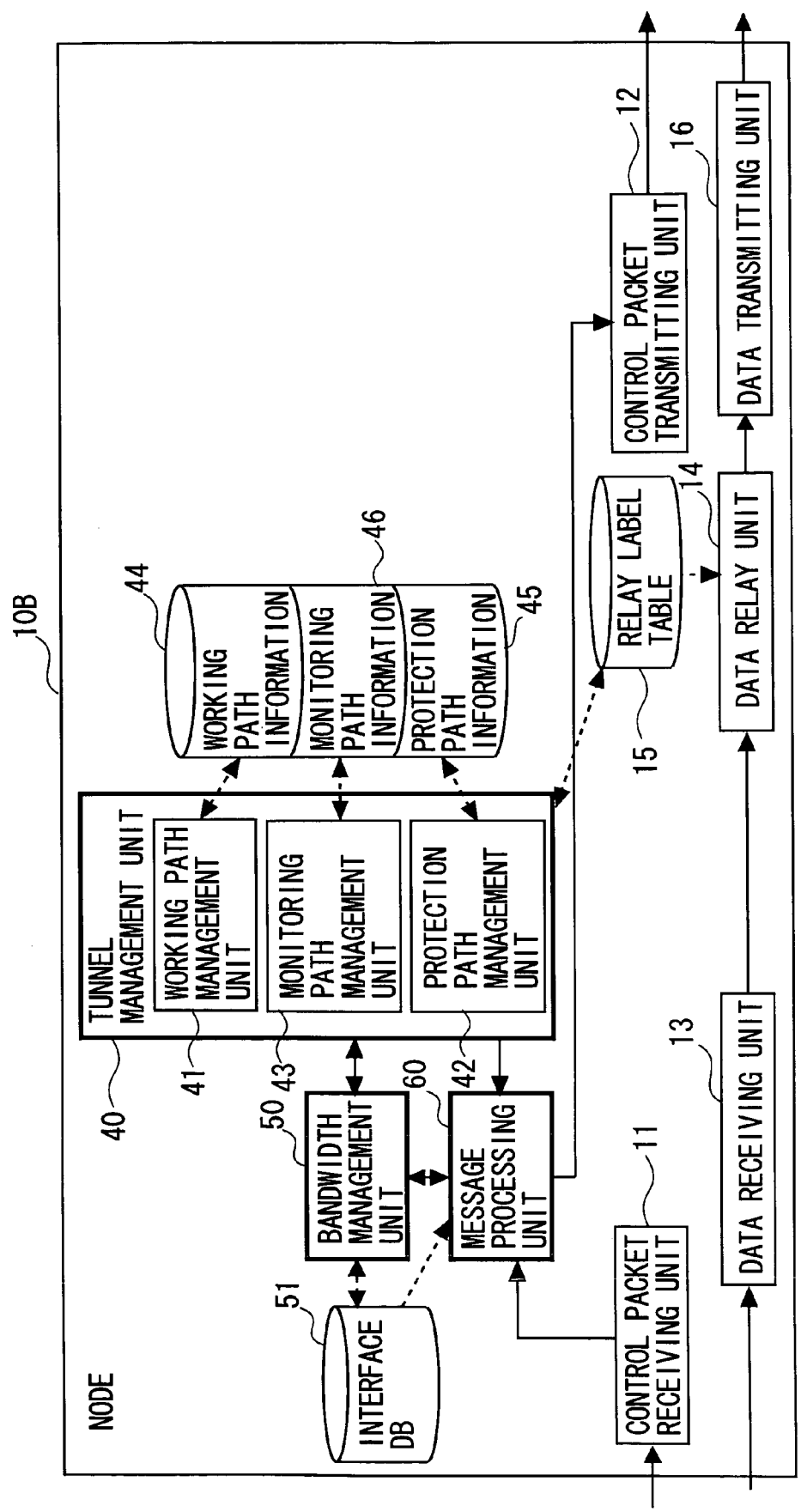
FIG. 2B is a diagram showing an example of a configuration possessed by a node becoming a relay node of the protection path on the network shown in FIG. 1.

Next, examples of configurations of the nodes A-L described above will be explained. FIG. 2A is a diagram of a configuration of a node (a node device 10A) serving as an originating node of the protection path. FIG. 2B is a diagram of a configuration of a node (a node device 10B) serving as a relay node of the protection path.

In FIG. 2A, the node device 10A includes a command receiving unit 20, a failure restoration processing unit 30, a tunnel management unit 40, a bandwidth management unit 50 and a message processing unit 60. Further, the node device 10A has a failure restoration table 35 managed by the failure restoration processing unit 30.

Moreover, the node device 10A includes a working path information table 44, a protection path information table 45 and a monitoring path information table 46, which are managed by the tunnel management unit 40. Further, the node device 10A includes an interface database (interface DB) 51 to which the bandwidth management unit 50 and the message processing unit 60 refer.

Moreover, the node device 10A includes a control packet receiving unit 11, a control packet transmitting unit 12, a data receiving unit 13, a data relay unit 14, a label table 15 for relaying and a data transmitting unit 16.

The command receiving unit 20 receives a command inputted from outside. The failure restoration processing unit 30 and the tunnel management unit 40 are notified of the command. The failure restoration processing unit 30 controls processes related to restoration from the failure on the working path. The failure restoration processing unit 30 includes an associating judging unit 31, a protection segment setting unit 32, a monitoring path control unit 33 and a switching judging unit 34.

The associating judging unit 31 handles processes related to associating the protection path, the working path and the monitoring path with each other. The protection segment setting unit 32 executes a setting process of setting the protection segment of the working path protected by the protection path, and so on. The monitoring path control unit 33 controls a setup process (control) of setting up the monitoring path for the protection segment. The switching judging unit 34, if the failure in the protection segment is detected by the monitoring path, judges whether or not the route of the working path is switched over to the route of the protection path. The failure restoration table 35 is stored with information used for executing the failure restoration process when the failure occurs on the working path.

The tunnel management unit 40 controls processes related to setting and management of the paths (tunnels). The tunnel management unit 40 has a working path management unit 41 for executing processes related to the working path, a protection path management unit 42 for executing processes related to the protection path, and a monitoring path management unit 43 for executing processes related to the monitoring path.

The working path information table 44 is stored with working path information (FIG. 3B). The protection path information table 45 is stored with protection path information (FIG. 3C). The monitoring path information table 46 is stored with monitoring path information (FIG. 3D).

The bandwidth management unit 50 manages the bandwidths of the paths set on the network. The interface DB 51 is stored with bandwidths of protection nodes related to the protection segment and protection links with respect to an output interface of a self-node via which the protection path passes. To be specific, the interface DB 51 is stored with a node failure table 51a (FIG. 4A) prepared for every output interface (every interface from which to send the data packet onto the protection path) of the self-node via which the protection path passes, and with a link failure table 51B (FIG. 4B).

The message processing unit 60 generates a message (a signaling message) for setting up the path, and analyzes a message (e.g., the signaling message) contained in a control packet received by the control packet receiving unit 11.

The control packet receiving unit 11 receives the control packet from the node on an upstream (uplink) side and supplies the control packet to the message processing unit 60. The control packet transmitting unit 12 sends, to a node on a downstream (downlink) side, the control packet including a message supplied from the message processing unit 60.

The data receiving unit 13 receives the data (the data packet). The data relay unit 14 refers to a label (an input label) attached to the data inputted from the data receiving unit 13, and searches the relay label table 15 for an output label associated with the input label. The data relay unit 14 attaches the retrieved output label to the data and supplies the label-attached data to the data transmitting unit 16. The data transmitting unit 16 forwards the data toward a next node (next hop node) from an interface corresponding to the output label.

As shown in FIG. 2B, the node device 10B serving as the relay node on the protection path has a configuration, wherein the command receiving unit 20 and the failure restoration processing unit 30 are removed from the node device 10A. The configuration shown in FIG. 2B is, however, illustrated as a configuration necessary for the node device 10B to operate as the relay node on the protection path. Hence, each of the nodes disposed as the nodes A-L on the network may be configured to have the configuration shown in the node device 10A.

It should be noted that the command receiving unit 20, the failure restoration processing unit 30, the tunnel management unit 40, the bandwidth management unit 50 and the message processing unit 60 are configured as functions actualized in such a way that, for example, a processor (e.g., a CPU) mounted in the node executes a program stored on a storage device (a memory). The functions in these blocks can be also, however, actualized by hardware logics.

Moreover, the failure restoration table 35, the working path information table 44, the protection path information table 45, the monitoring path information table 46, the interface DB 51 and the relay label table 15 are generated on the storage device (e.g., memory) mounted on the node device.

Furthermore, the control packet receiving unit 11, the control packet transmitting unit 12, the data receiving unit 13, the data relay unit 14 and the data transmitting unit 16 can be realized by employing, for instance, hardware switches and the hardware logics.

The storage device stored with the respective tables and the DB functions as a working path (the protection path or the monitoring path) information storage unit, a failure restoration information storage unit and an interface information storage unit corresponding to the present invention. Further, the bandwidth management unit 50 and the message processing unit 60 correspond to a bandwidth management unit and a message processing unit of the present invention, and the tunnel management unit 40 corresponds to a path management unit of the present invention.

Further, the control packet receiving unit 11 corresponds to a receiving unit of the present invention, and the bandwidth management unit 50 corresponds to an extraction unit, a judging unit, an output unit and a specifying unit of the present invention. Moreover, the failure restoration processing unit 30 corresponds to a usage bandwidth determination unit of the present invention, and the message processing unit 60 corresponds to a generation unit of the present invention.

<Data Structure of Table>

Given next are explanations of data structures of the failure restoration table 35, the working path information table 44, the protection path information table 45, the monitoring path information table 46 and the interface DB 51 that are provided in the node device 10A shown in FIG. 2A and in the node device 10B shown in FIG. 2B.

FIG. 3A is a diagram showing an example of the data structure of the failure restoration table 35. FIG. 3B is a diagram showing an example of the data structure of the working path information table 44. FIG. 3C is a diagram showing an example of the data structure of the protection path information table 45. FIG. 3D is a diagram showing an example of the data structure of the monitoring path information table 46.

Furthermore, FIG. 4A is a diagram showing an example of a data structure of a node failure table 51A stored on the interface DB 51. FIG. 4B is a diagram showing an example of a data structure of a link failure table 51B stored on the interface DB 51.

As shown in FIG. 3A, the failure restoration table 35 has one or more entries for storing information on the protection path and pieces of information about the working path and the monitoring path that are associated with the protection path. The entry has a plurality of items consisting of a protection path ID, designation or non-designation of the protection segment, a protection segment, a usage bandwidth, a working path ID and a monitoring path ID.

The protection path ID is an identifier of the protection path. The designation or non-designation of the protection segment represents whether the protection segment is designated or not (whether the protection segment is designated by a command or not). The protection segment represents a protection segment on the network, which is protected by the protection path. The usage bandwidth shows a bandwidth value requested of the protection path. The working path ID represents an identifier of the working path having the protection segment protected by the protection path. The monitoring path ID is an identifier of the monitoring path that monitors the protection segment.

As shown in FIG. 3B, the working path information table 44 has one or more entries for storing working path information, per working path. The entry has a plurality of items consisting of a working path ID, route information and bandwidth information.

The working path ID is an identifier of the working path. The route information indicates a route extending from an originating point down to a terminating point of the working path. In the embodiment, the route is expressed by the IP addresses of the nodes on the path. The bandwidth information represents a bandwidth value allocated to the working path.

As shown in FIG. 3C, the protection path information table 45 has one or more entries for storing the protection path information, per protection path. The entry has a plurality of items consisting of a protection path ID, route information and bandwidth information. The protection path ID is an identifier of the protection path. The route information represents a route extending from an originating point down to a terminating point of the protection path. The route information indicates a bandwidth value allocated to the protection path.

As shown in FIG. 3D, the monitoring path information table 46 has one or more entries for storing monitoring path information for every monitoring path. The entry has a plurality of items consisting of a monitoring path ID, route information and bandwidth information. The monitoring path ID is an identifier of the monitoring path. The route information represents a route extending from an originating point down to a terminating point of the monitoring path.

The interface DB 51 includes, as shown in FIGS. 4A and 4B, a node failure table 51A stored with information on nodes (protection nodes) within the protection segment protected by the protection path, and a link failure table 51B stored with information on links (protection links) within the protection segment.

The node failure table 51A is stored with the bandwidths required for the respective protection nodes protected by the individual protection paths. In an example shown in FIG. 4A, the table 51A is stored with protection nodes C(IP_C), B(IP_B) and F(IP_F) included in the protection path 0 and the protection path 1 and with bandwidth values [Mbps] for every protection path, which are allocated to these protection nodes. The entries as viewed from the respective protection paths in the table 51A are stored with the protection nodes protected by the protection paths and with the bandwidth values needed by the respective protection nodes.

Further, the node failure table 51A is stored with a total value of the bandwidths allocated to the protection paths that are set in the respective nodes and with a maximum value in these total values. The example shown in FIG. 4A is that 30 [Mbps], 40 [Mbps] and 10 [Mbps] are stored as the total vales of the bandwidths for the protection nodes C, B and F. Each total value represents a bandwidth value required when a failure occurs in the corresponding protection node. Further, 40 [Mbps] is stored as the maximum value in the total values.

On the other hand, the link failure table 51B is, as shown in FIG. 4B, stored with the bandwidths necessary for (requested of) the respective protection links protected by the individual protection paths. An example shown in FIG. 4B is that the table 51B is stored with the respective protection links IP_A-IP_B, IP_B-IP_C, IP_C-IP_D, IP_E-IP_B, IP_B-IP_F, and IP_F-IP_G included in the protection path 0 and the protection path 1, and with a bandwidth value (30 Mbps) of the protection path 0 and a bandwidth value (10 Mbps) for the protection path 1, which are requested of the respective protection links.

Moreover, the link failure table 51B is stored with a total value of the bandwidths allocated to the protection paths set in the respective protection links and with a maximum value in these total values. In the example shown in FIG. 4B, 30 [Mbps] or 10 [Mbps] is stored as the total value associated with each protection link. Moreover, 30 [Mbps] is stored as a maximum value in the total values. Each of the total values represents a bandwidth value needed when a failure occurs in the corresponding link.

Operational Example 1

Next, an operational example of the network system will be described. To begin with, an operational example 1 will exemplify how an originating node (PLR) of the protection path executes setup of the protection path (a case where the protection segment is explicitly designated).

Herein, it is assumed that on the network illustrated in FIG. 1, a protection path 1 (A→K→L→D) protecting a segment (A→B→C→D) of a working path 1 is newly set. In the operational example 1, when setting up the protection path, the protection path is automatically associated with the working path. Further, a monitoring path for the working path is generated.

Figure 5:
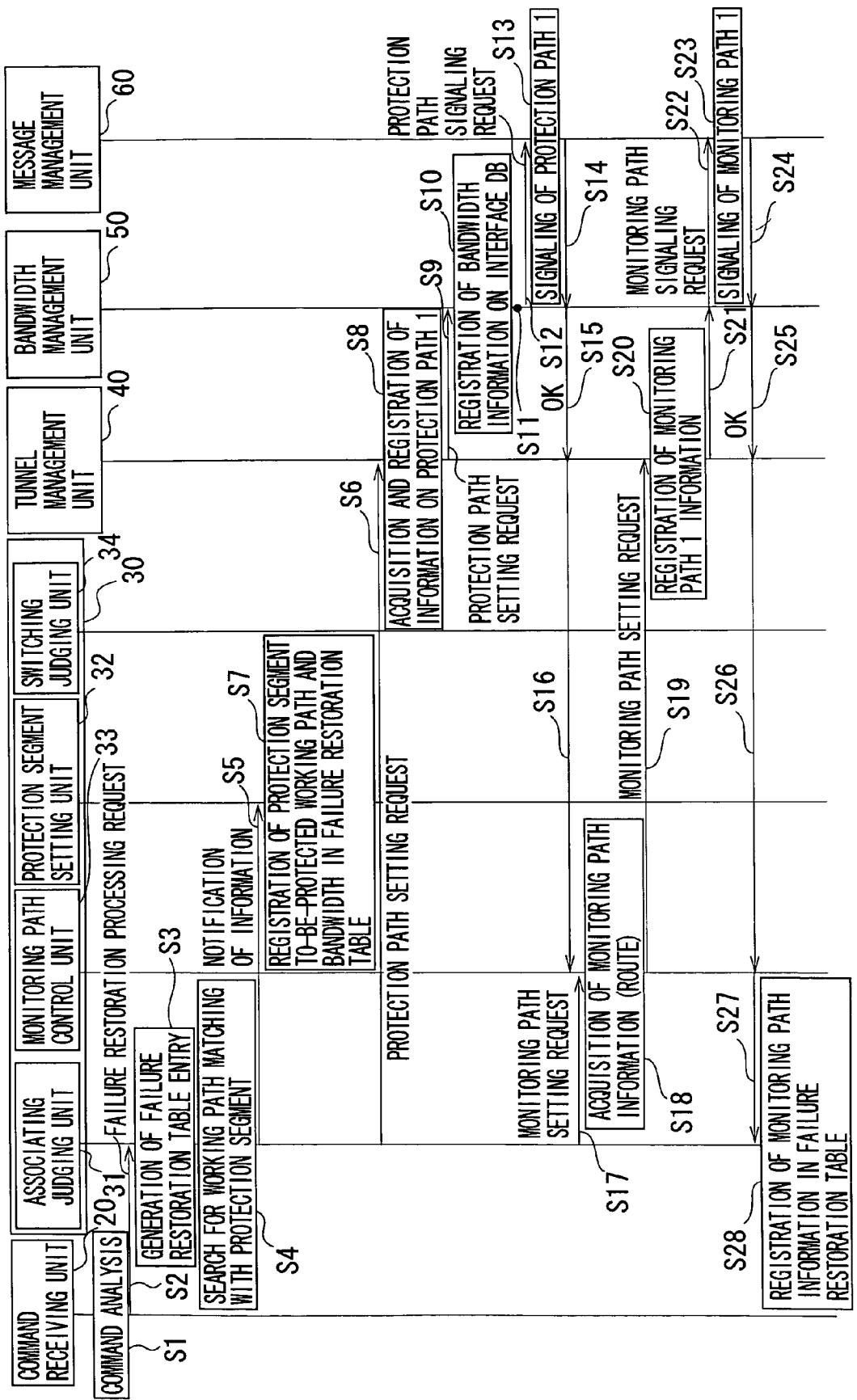
FIG. 5 is a sequence diagram showing a process in the head-end node of the protection path in the operational example 1.

FIG. 5 is a sequence diagram showing a process of the originating node (the node A) of the protection path 1 in the operational example 1. When the protection path is set, a protection path generating command is inputted to the originating node of the protection path. Herein, the protection path generating command is inputted to the node A corresponding to the originating node of the protection path.

The protection path generating command contains a route of the protection path and a protection segment as parameters. Herein, "IP_A-IP_K-IP_L-IP_D" is given as the route of the protection path 1. Further, "IP_A-IP_B-IP_C-IP_D" is given as the protection segment by the protection path 1. The route and the protection segment are expressed by enumerating the node IDs (herein, a representative IP address is applied) in the sequence of passage.

The command receiving unit 20 of the node A receives the protection path generating command. The command receiving unit 20 analyzes the received command (S1). Herein, the command receiving unit 20 recognizes that the command is the protection path generating command. In this case, the command receiving unit 20 notifies, for set up the protection path, the associating judging unit 31 in the failure restoration processing unit 30 of a failure restoration processing request (notification parameters: the route and the protection segment).

The associating judging unit 31, at first, creates a new entry for the protection path 1 in the failure restoration table 35 (FIG. 3A) (S3). Next, the associating judging unit 31 registers the protection path ID (protection path 1) in the failure restoration table 35. Subsequently, the associating judging unit 31 refers to, in order to search for a working path ID of the working path of which a route matches with the protection segment, the working path information stored in the working path information table 44 (FIG. 3B) (S4).

Herein, only the working path 1 matches with the protection segment. Accordingly, the associating judging unit 31 acquires the working path ID of the working path 1. At this time, the associating judging unit 31 also acquires a route and bandwidth information of the working path 1. The associating judging unit 31 notifies the protection segment setting unit 32 of the protection path ID, the protection path route, the protection segment, the working path ID, the working path route and the usage bandwidth of the working path (S5).

The associating judging unit 31 notifies the tunnel management unit 40 of a setup request for setting up the protection path 1 (S6). This setup request contains, as parameters, the protection path ID and the protection path route (IP_A-IP_K-IP_L-IP_D).

Figure 6:
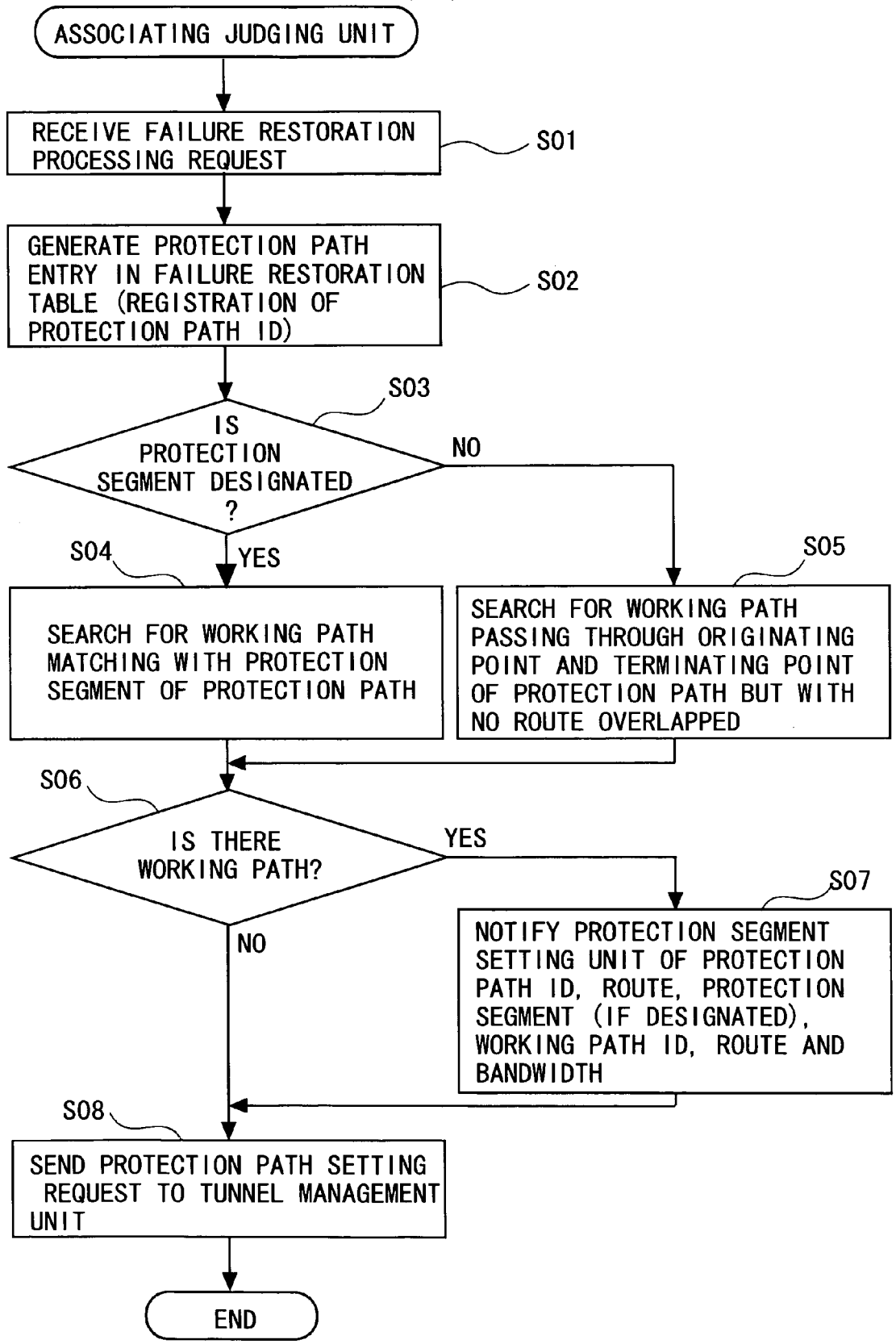
FIG. 6 is a flowchart showing an example of a failure restoration process executed by an associating judging unit.

FIG. 6 is a flowchart showing a process of steps S3, S4, S5 and S7 by the associating judging unit 31. In FIG. 6, the associating judging unit 31 receives a failure restoration processing request (S01). The associating judging unit 31 creates an entry for a protection path in the failure restoration table 35 (S02). At this time, the protection path ID is registered in the entry.

Next, the associating judging unit 31 judges whether the protection segment is designated or not (S03). At this time, if the protection segment is designated (S03; YES), a working path matching with the protection segment of the protection path is retrieved (S04). Where as if the protection segment is not designated (S03; NO), a working path passing through the originating point and the terminating point of the protection path and having a route not overlapping with the protection path, is retrieved (S05).

Next, the associating judging unit 31 judges whether or not the working path has been retrieved in step S04 or S05 (S06). If the working path has been retrieved (S06; YES), the associating judging unit 31 notifies the protection segment setting unit 32 of the protection path ID, the route of the protection path, the protection segment (if designated), the working path ID, and the route and the bandwidth of the working path (S07). Thereafter, the processing advances to step S08.

While on the other hand, if none of the working path has been retrieved (S06; NO), the processing also advances to step S08. In step S08, the associating judging unit 31 sends the protection path setup request to the tunnel management unit 40. Upon an end of step S08, the associating judging unit 31 finishes the process.

Referring back to FIG. 5, the protection segment setting unit 32 computes a usage bandwidth of the protection path from a total sum of the usage bandwidths of the working path matching with the protection segment. In this example, the working path matching with the protection segment is only the working path 1. Hence, the protection segment setting unit 32 computes a usage bandwidth of 30 Mbps of the working path 1 as a bandwidth required of the protection path 1.

The protection segment setting unit 32 registers the information (i.e., the protection segment, the working path ID and the required bandwidth) of the protection path 1 in the failure restoration table 35 (FIG. 3A) (S7). Thus, the information of the protection path and the information of the working path protected by this protection path are registered in the failure restoration table 35.

Figure 7:
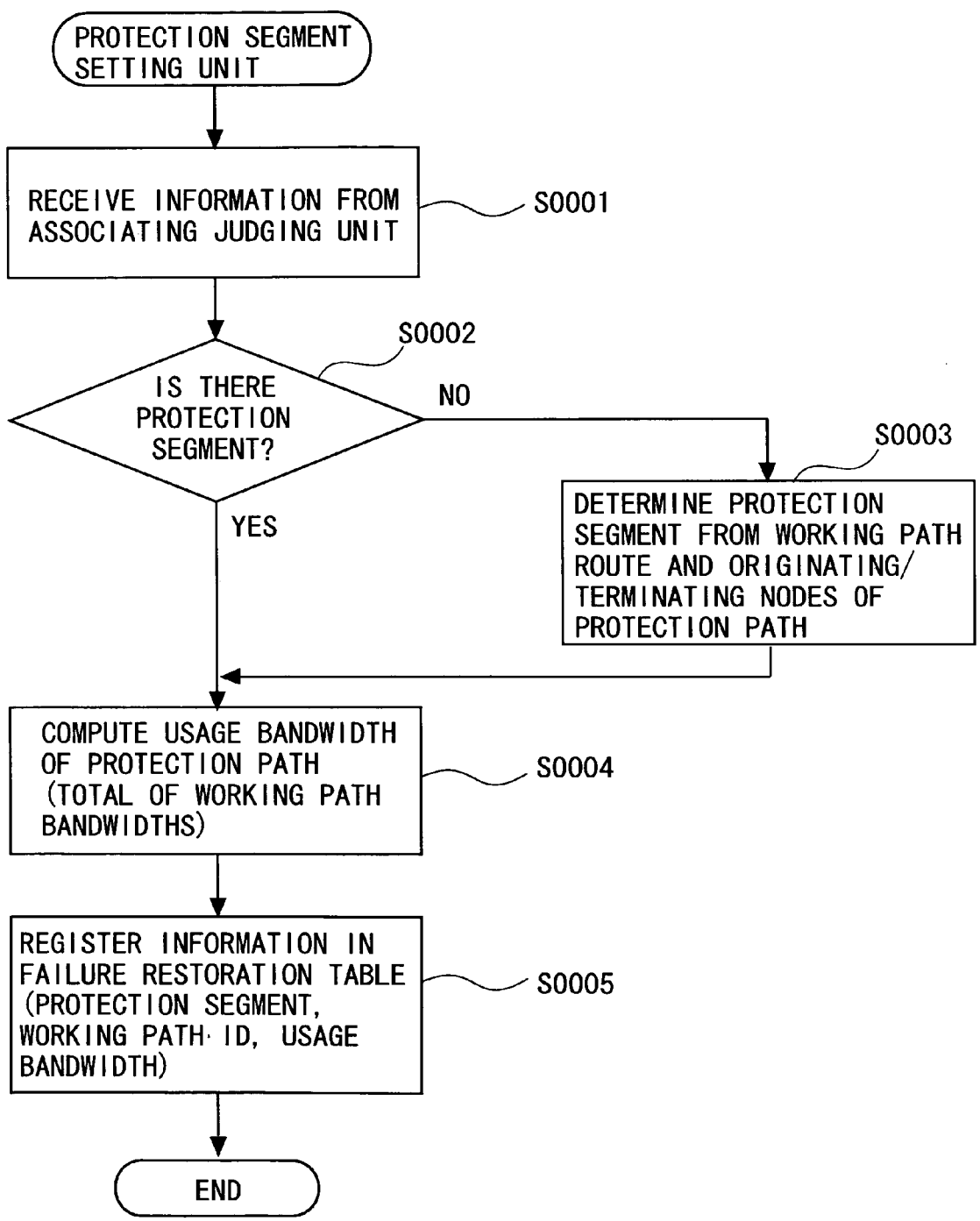
FIG. 7 is a flowchart showing an example of a registration process in a failure restoration table, which is executed by a protection segment setting unit.

FIG. 7 is a flowchart showing a process by the protection segment setting unit 32 in step S7 described above. In FIG. 7, the protection segment setting unit 32 receives the information (parameters) from the associating judging unit 31 (S0001). The protection segment setting unit 32 judges whether the parameters contain the protection segment or not (S0002).

At this time, if the protection segment is not contained, (S0002; NO), the protection setting unit 32 determines the protection segment from the route of the working path and from the originating node and the terminating node of the protection path (S0003). Thereafter, the processing advances to step S0004. If the protection segment is contained (S0002; YES), the processing also advances to step S0004.

In step S14, the protection segment setting unit 32 computes a usage bandwidth of the protection path (S0004). Namely, the protection segment setting unit 32 computes, as the usage bandwidth of the protection path, a total value of the bandwidths of a single or plural working paths protected by the protection path.

Finally, the protection segment setting unit 32 registers the information in the failure restoration table 35 (S0005) Namely, the protection segment setting unit 32 registers the protection segment by the protection path, the working path ID and the usage bandwidth of the protection path in the corresponding entries in the failure restoration table 35. When finishing step S15, the protection segment setting unit 32 finishes the processing.

Referring again back to FIG. 5, the tunnel management unit 40, by using, as a key, the protection path ID which the associating judging unit 31 has notified of, obtains the information (the request bandwidth and the protection segment) of the protection path 1 from the failure restoration table 35. The tunnel management unit 40 registers, in the protection path information table 45 (FIG. 3C), the protection path ID (the protection path 1), the route (IP_A-IP_K-IP_L-IP_D) and the bandwidth (30 Mbps) related to the new protection path (the protection path 1) as the protection path information (S8).

The tunnel management unit 40 notifies the bandwidth management unit 50 of a protection path setup request (S9). This setup request contains, as parameters, the protection path ID (the protection path 1), the route (IP_A-IP_K-IP_L-IP_D), the bandwidth (30 Mbps) and the protection segment (IP_A-IP_B-IP_C-IP_D). Note that the process of the tunnel management unit 40 is executed by, e.g., the protection path management unit 42.

The bandwidth management unit 50 specifies an interface corresponding to the protection path setup request. Namely, the bandwidth management unit 50 specifies, from the route of the protection path, the output interface of the self-node located on this route, and refers to the interface DB 51 matching with the specified interface.

The bandwidth management unit 50 registers a protection path ID, a protection node, a protection link and a required bandwidth (a usage bandwidth) as interface information related to the protection path 1 in the interface DB 51 (the node failure table 51A (FIG. 4A), the link failure table 51B (FIG. 4B)). The interface information is generated from the parameters contained in the protection path setup request.

With the registration of the interface information, contents registered in the node failure table 51A and the link failure table 51B at this point of time become statuses shown in FIGS. 4A and 4B. Herein, the bandwidth management unit 50 computes a bandwidth required for setting up the protection path, and checks whether the required bandwidth can be ensured or not (S11).

<<Computation and Check of Bandwidth>>

Herein, a detailed description of how the bandwidth management unit 50 computes and checks the bandwidth (S11) will be made. The bandwidth management unit 50 updates, based on the parameters in the protection path setup request, the interface DB 51 (the node failure table 51A and the link failure table 51B) matching with the protection path. To be specific, the bandwidth management unit 50 refers to the interface DB 51 matching with the interface 1 (FIG. 1) of the associated self-node by use of the route information of the protection path 1.

The interface DB 51 (the node failure table 51A and the link failure table 51B) of the interface 1 is already registered with the information on the protection path 0 (see FIGS. 4A and 4B). The bandwidth management unit 50 registers the information concerning the protection path 1 in the respective tables 51A and 51B.

Herein, the protection segment of the protection path 1 is "IP_A-IP_B-IP_C-IP_D". Accordingly, the bandwidth management unit 50 recognizes that the protection links are three links such as "IP_A-IP_B", "IP_B-IP_C" and "IP_C-IP_D". Further, the bandwidth management unit 50 recognizes that the protection nodes are two nodes such as the node B(IP_B) and the node C(IP_C).

The bandwidth management unit 50 creates entries for the protection node and the protection link for the protection path 1 on the node failure table 51A and on the link failure table 51B. At this time, the bandwidth management unit 50 stores, in each of the entries, information that 30 Mbps is used on the protection path 1.

Namely, the bandwidth management unit 50 stores 30 [Mbps] in the entries corresponding to the nodes Bandwidth C with respect to the protection path 1 in the table 51A. Further, the bandwidth management unit 50 stores 30 [Mbps] in the entries corresponding to the links "IP_A-IP_B", "IP_B-IP_C" and "IP_C-IP_D" with respect to the protection path 1 in the table 51B.

Next, the bandwidth management unit 50 checks in the following procedures whether the bandwidth requested of the setup of the protection path can be ensured or not.

(Procedure 1) The bandwidth management unit 50 computes a total value of the bandwidths required of every protection link and every protection node. This total value is a total value of the usage bandwidths of the protection path(s) that protects the protection links and the protection nodes. In this example, the protection path 0 is preset, and now the protection path 1 is additionally registered. Therefore, the entry having a plurality of entries of the protection paths is only the protection node IP_B. The bandwidth (the total value) needed by the protection node IP_B becomes 40 [Mbps].

(Procedure 2) The bandwidth management unit 50 determines a maximum value in the total values computed in the procedure 1 as a bandwidth required of the protection path 1. Namely, the maximum value in the table 51A is compared with the maximum value in the table 51B, and the larger maximum value is determined as the maximum value required of the setup of the protection path 1. Herein, the maximum value "40 Mbps" in the table 51A is determined as the bandwidth required of the setup of the protection path 1.

(Procedure 3) The bandwidth management unit 50 compares the bandwidth (the maximum value) required of the setup of the protection path 1 with an upper limit value of the bandwidth usable at the interface. This example is that 50 Mbps is the upper limit value of the bandwidth, for the protection path, usable at each interface of each node. In this respect, the determined required bandwidth (the maximum value) is 40 Mbps. Accordingly, any deficiency of the bandwidth does not occur (the required bandwidth can be ensured), and hence a check result is "OK". It is to be noted that the upper limit value is previously stored within, e.g., the interface DB 51.

If a failure occurs in a certain node or link, all the protection paths protecting this node or link are utilized for failure restoration. The bandwidth for the protection path, which is set in the interface, is employed. Herein, if possible of ensuring the determined required bandwidth (the maximum value), and, even in case the failure occurs in any one of the nodes or the links on the protection segment, this node or link can be restored from the failure without causing any deficiency of the bandwidth.

When the bandwidth check ends up with "OK" in its check result, the bandwidth management unit 50 requests the message processing unit 60 for signaling to set up, as shown in FIG. 5, the protection path (the protection path 1) (S12). The message processing unit 60 executes a signaling process (S13). As a result of the signaling, when the protection path 1 is set, the associating judging unit 31 is notified of an "OK" message via the bandwidth management unit 50 and the tunnel management unit 40 (S14, S15, S16).

Figure 8:
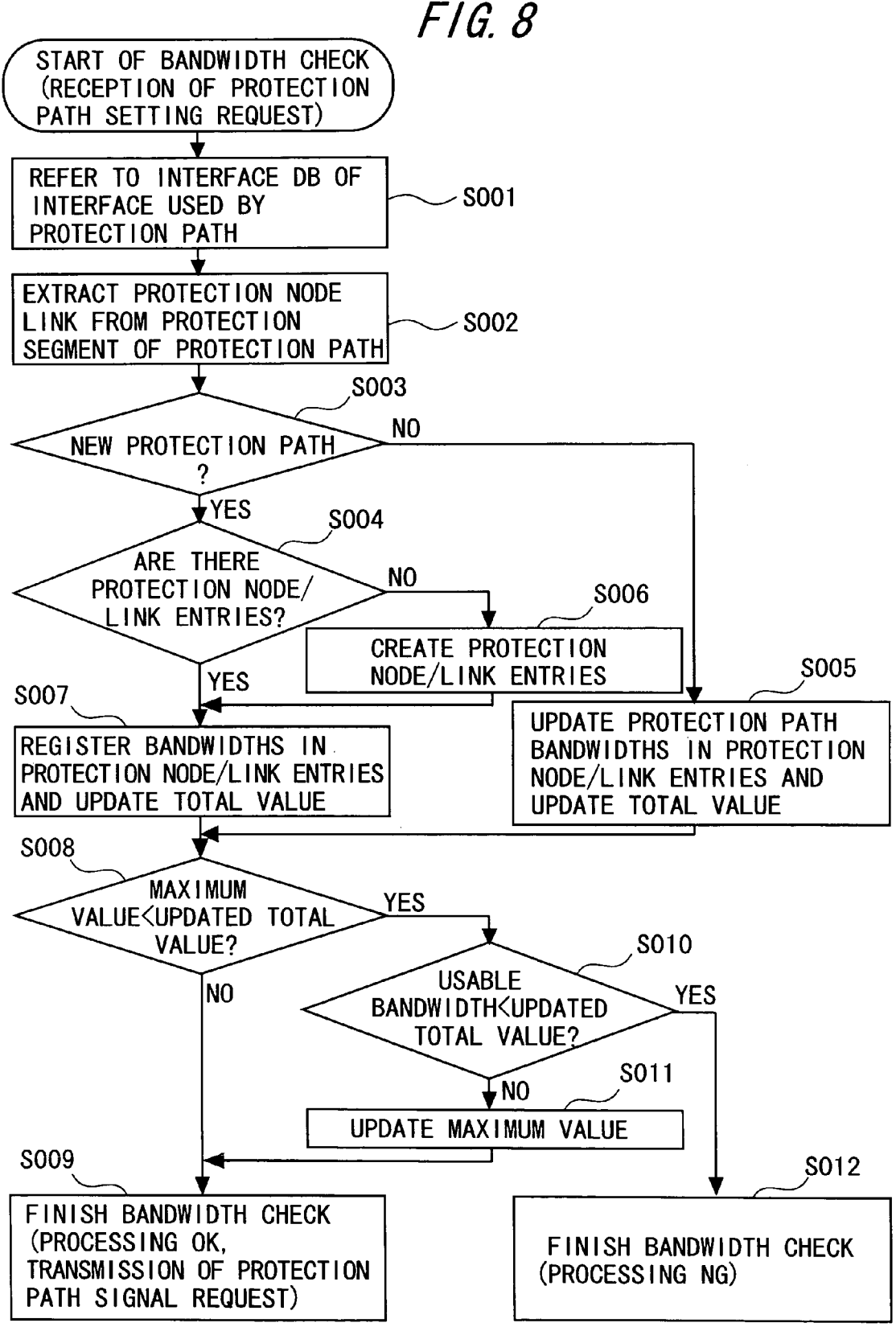
FIG. 8 is a flowchart showing an example of the registration process in the interface DB and a bandwidth check process of the protection path, which are executed by a bandwidth management unit.

FIG. 8 is a flowchart showing details of the process (S10 and S11) by the bandwidth management unit 50. In an example shown in FIG. 8, the bandwidth management unit 50 starts the process as triggered by receiving the protection path setup request from the tunnel management unit 40.

At first, the bandwidth management unit 50 refers to the interface DB 51 of the interface 1 employed for setup the protection path (S001). Next, the bandwidth management unit 50 extracts the protection nodes and the protection links from the protection segment of the protection path, which are contained in the protection path setup request (S002).

Next, the bandwidth management unit 50 judges whether or not the protection path related to the protection path setup request is a new protection path. At this time, if the protection path is a new protection path (S003; YES), the processing advances to step S004. Whereas if not being the new protection path (S003; NO), the processing advances to step S005.

In step S04, the bandwidth management unit 50 judges whether or not the interface DB 51 has the entries for the protection node and the protection link matching with the protection path. If judged to have the entries (S004; YES), the processing advances to step S007. Whereas if judged not to have the entries (S004; NO) the processing advances to step S006.

In step S006, the bandwidth management unit 50 creates the entries for the protection node and the protection link matching with the protection path, and gets the processing advanced to step S007. In step S007, the bandwidth management unit 50 registers the request bandwidths of the protection path in the entries for the protection node and the protection link, and updates the total value of the request bandwidths. Upon finishing step S007, the processing proceeds to step S008.

On the other hand, in step S005, the bandwidth management unit 50 updates the required bandwidths of the protection node and the protection link corresponding to the protection path, and also updates the total value of the required bandwidths. When step S005 is ended, the processing advances to step S008.

In step S008, the bandwidth management unit 50 compares the updated total value with the maximum value in the total values, and judges whether the updated total value is larger than the maximum value or not. At this time, if the total value is smaller than the maximum value (S008; NO), the bandwidth management unit 50 finishes this bandwidth check process (S009). Namely, the bandwidth management unit 50 judges that the check result is "OK", and notifies the message processing unit 60 of a signaling request for setup the protection path.

By contrast, if the total value is larger than the maximum value (S008; YES), the bandwidth management unit 50 judges whether or not the updated total value is larger than an upper limit value of the bandwidth usable for the protection path (S010). If the total value is smaller than the upper limit value (S010; NO), the bandwidth management unit 50 rewrites the maximum value in the total values into the updated total value (S011), and makes the processing advance to step S009.

In contrast with this, if the total value is larger than the upper limit value (S010; YES), the bandwidth management unit 50 terminates this bandwidth check process (S012). Namely, the bandwidth management unit 50 judges that the check result is "NG". In this case, the signaling for setting up the protection path is not conducted.

<<Setup of Monitoring Path>>

In FIG. 5, the associating judging unit 31, upon receiving the OK message, for setting up the monitoring path, notifies the monitoring path control unit 33 of a monitoring path setup request (S17). The monitoring path setup request contains a protection path ID as a parameter.

Figure 9:
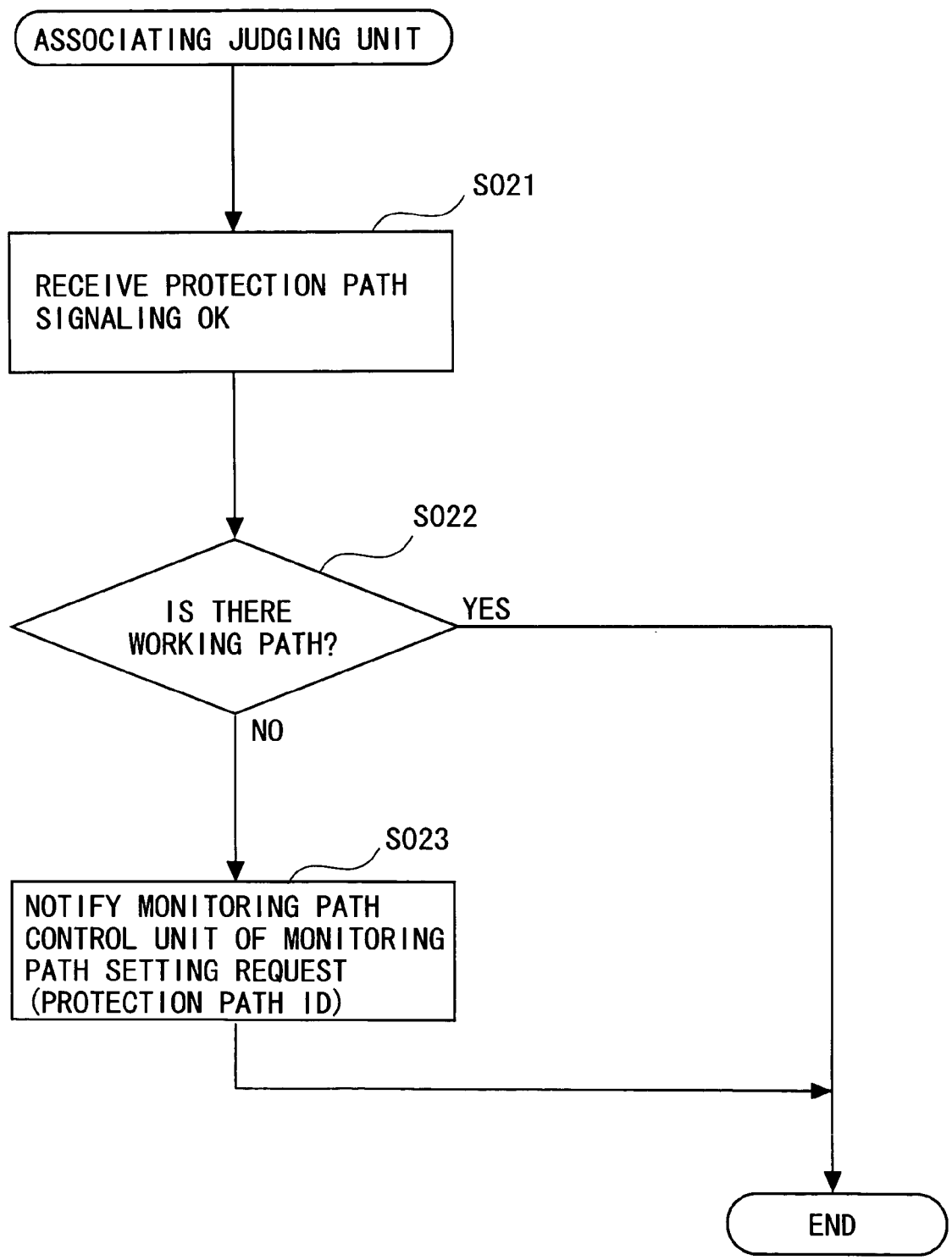
FIG. 9 is a flowchart showing a process executed by the associating judging unit when receiving an OK message for setting up the protection path.

FIG. 9 is a flowchart showing a process by the associating judging unit 31 in step S17 described above. In FIG. 9, the associating judging unit 31, when receiving the OK message (S021) judges whether or not there is a working path having the protection segment to be protected by the protection path (S022). At this time, if there is none of such a working path (S022; NO), the processing comes to an end.

Whereas if there is the working path (S022; YES), the associating judging unit 31 notifies the monitoring path control unit 33 of a monitoring path setup request (a notification parameter: a protection path ID) (S023). When finishing step S023, the associating judging unit 31 finishes the processing in FIG. 9.

Referring back to FIG. 5, the monitoring path control unit 33 refers to the failure restoration table 35 (FIG. 3A) by use of the protection path ID. The monitoring path control unit 33 acquires protection segment information (i.e., route information for the monitoring path) associated with the protection path ID (S18). The monitoring path control unit 33 generates a monitoring path ID (a monitoring path 1). Further, the monitoring path control unit 33 notifies a monitoring path ID tunnel management unit of a monitoring path setup request (S19). The monitoring path setup request contains, as parameters, the monitoring path ID and the monitoring path route information.

Figure 10:
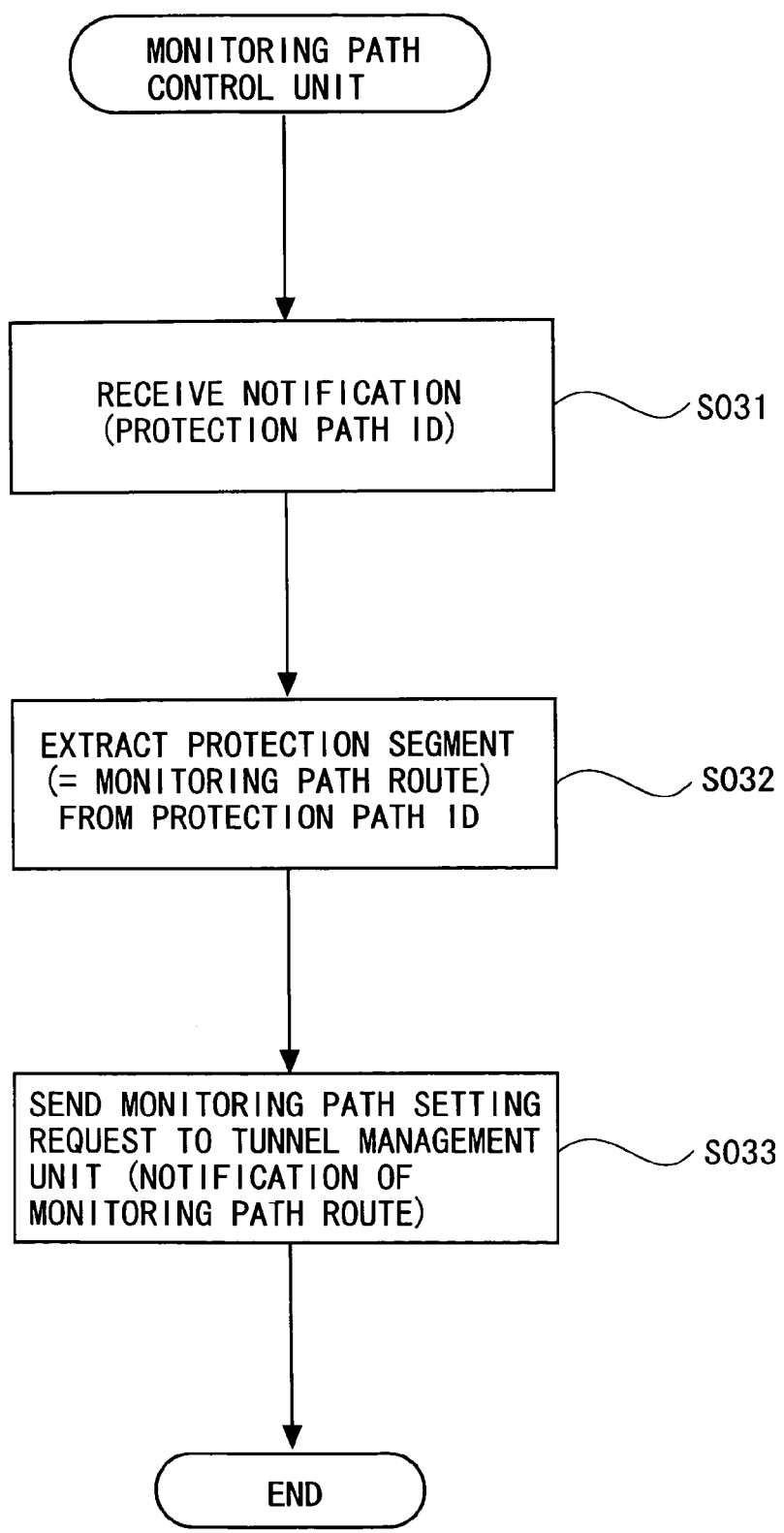
FIG. 10 is a flowchart showing a process executed by a monitoring path control unit when receiving a monitoring path setup request.

FIG. 10 is a flowchart showing a process by the monitoring path control unit 33 in steps S18-S19 described above. In FIG. 10, the monitoring path control unit 33 receives the notification (the protection path ID) from the associating judging unit 31 (S031). Next, the monitoring path control unit 33 acquires a monitoring path route on the basis of the protection path ID (S032). Then, the monitoring path control unit 33 sends the monitoring path setup request to the tunnel management unit 40 (S033), and finishes the processing.

Referring back to FIG. 5, the tunnel management unit 40 registers the monitoring path information (the monitoring path ID and the monitoring path route information) notified as parameters in the monitoring path information table 46 (FIG. 3D) (S20). Subsequently, the tunnel management unit 40 notifies the bandwidth management unit 50 of the monitoring path setup request (S21). The monitoring path setup request contains the monitoring path ID and the monitoring path route information as the parameters.

The bandwidth management unit 50, in the case of receiving the monitoring path setup request, does not execute the update process of the bandwidth information. The bandwidth management unit 50 requests the message processing unit 60 for the signaling to set up the monitoring path according to the monitoring path setup request (S22).

The message processing unit 60 executes the signaling process of the monitoring path (S23). As a result of the signaling, when the monitoring path is set, the message processing unit 60 notifies the associating judging unit 31 of an OK message via the bandwidth management unit 50, the tunnel management unit 40 and the monitoring path control unit 33 (S24, S25, S26, S27). The associating judging unit 31 registers the monitoring path ID in the failure restoration table 35 (S28).

Figure 11:
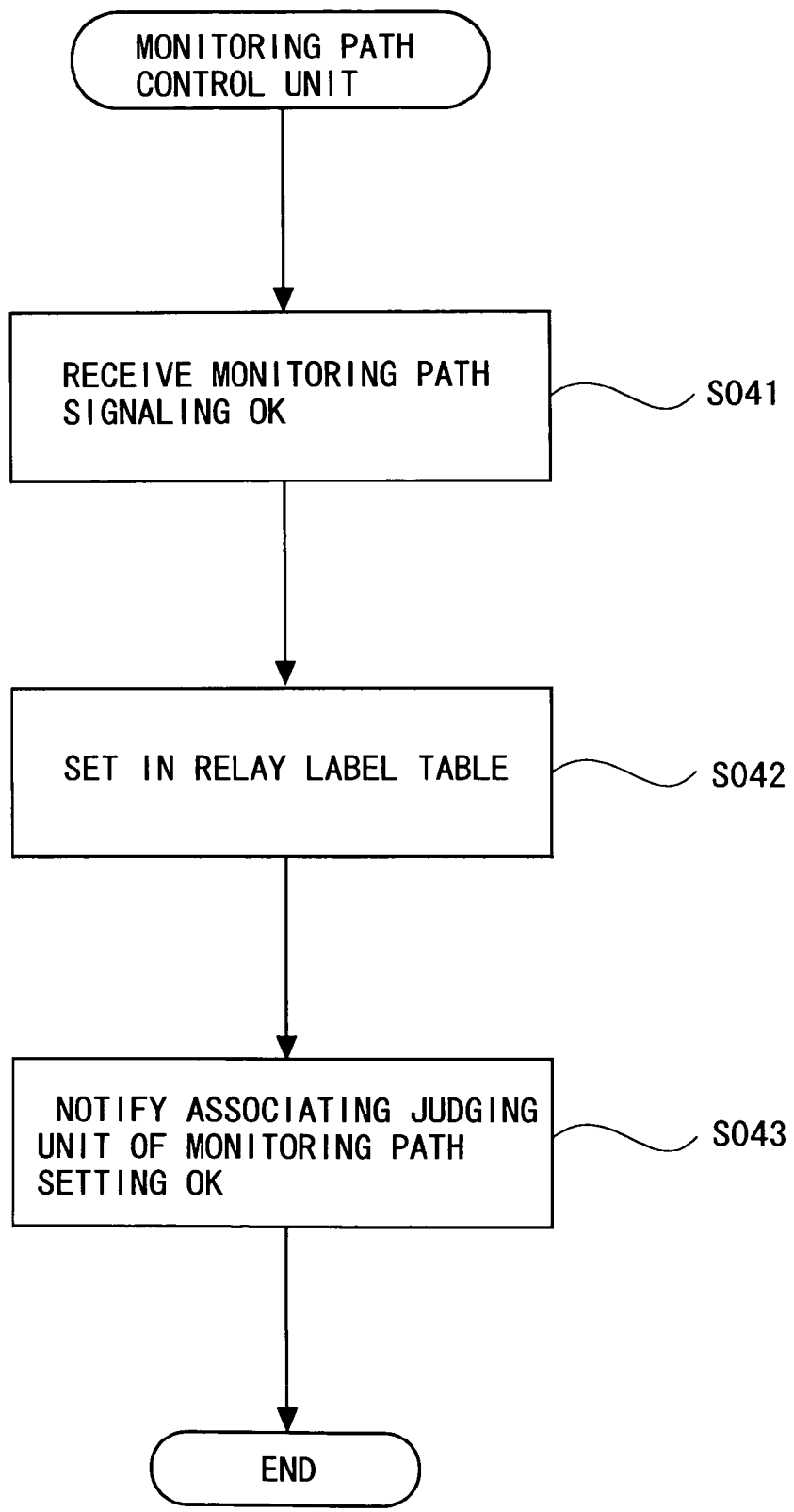
FIG. 11 is a flowchart showing a process executed by the monitoring path control unit when receiving an OK message for setting up the monitoring path.

FIG. 11 is a flowchart showing processes by the monitoring path control unit 33 in the case of receiving the OK message in step S26. In FIG. 11, the monitoring path control unit 33, upon receiving the OK message (S041), executes a setting process (such as registering a label for the monitoring path) in the relay label table 15 (S042). Then, the monitoring path control unit 33 notifies the associating judging unit 31 of the OK message (S043) thereby finishing the process.

Figure 12:
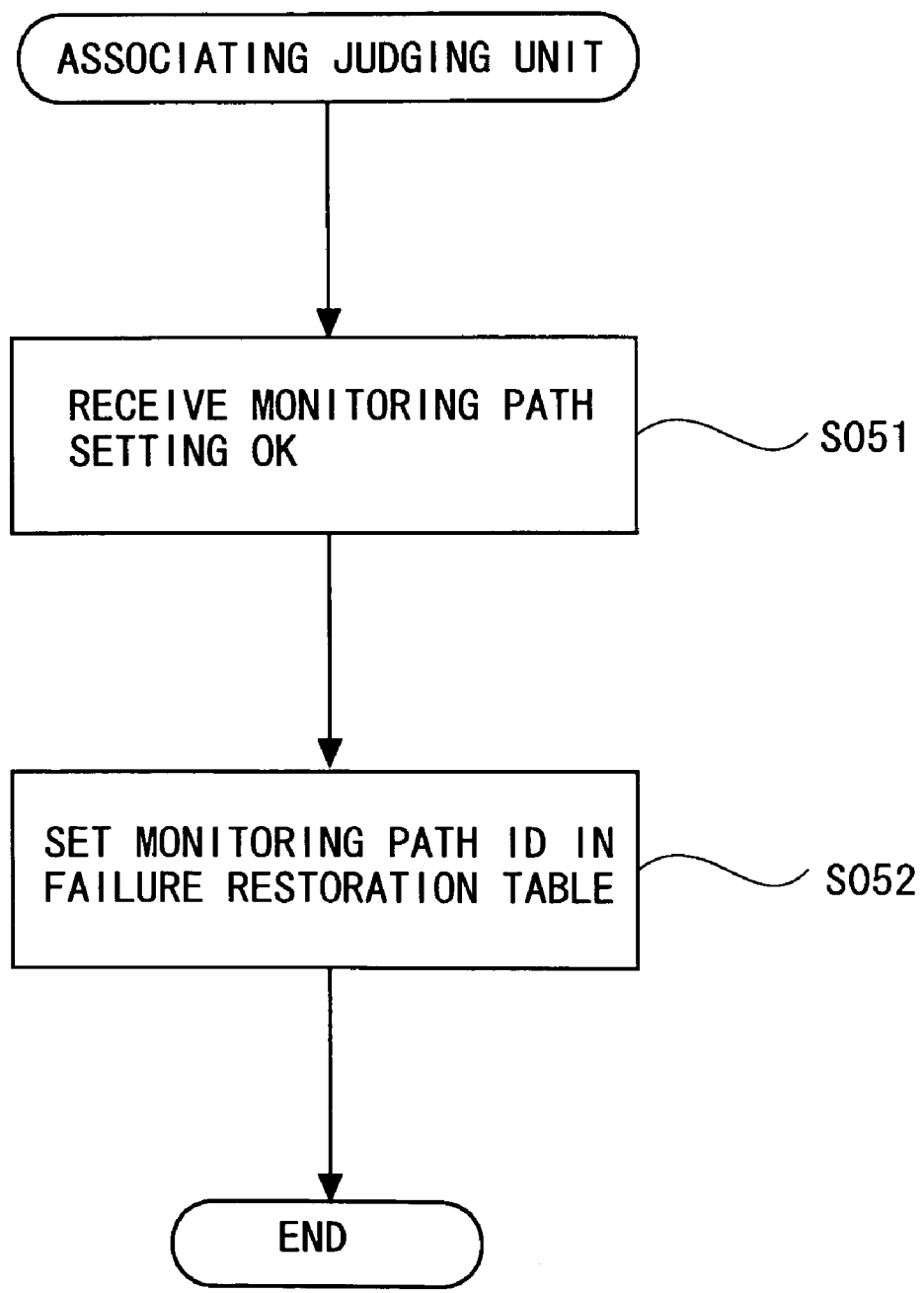
FIG. 12 is a flowchart showing a process executed by the associating judging unit when receiving the OK message for setting up the monitoring path.

FIG. 12 is a flowchart showing a process by the associating judging unit 31 in steps S27 and S28. In FIG. 12, the associating judging unit 31 receives the OK message for setting up the monitoring path (S051). Then, the associating judging unit 31 registers the monitoring path ID in the corresponding entry in the failure restoration table 35 (S052), and finishes the process.

Through the sequence explained so far in FIG. 5, when receiving notification of the failure, the information stored in the failure restoration table 35 is referred to. At this time, for example, the switching judging unit 34 can determine, based on the monitoring path ID, a switching target working path (a protection segment) and a protection path. Namely, in the example described above, when the node A receives the failure notification given by the monitoring path 1, the node A (e.g., the switching judging unit 34) refers to the failure restoration table 35, thereby making it possible to switch over the working path 1 to the protection path 1.

Operational Example 2

Next, a bandwidth check (an automatic bandwidth sharing computing process) in all nodes that the protection path passes, will be explained by way of an operational example 2

<<Signaling and Forwarding of Data Packet>>

As a premise of the discussion on the operational example 2, signaling for establishing a path and forwarding of a data packet will be explained.

The protection path is, as stated above, set (established) by the signaling of the protection path from the originating point (head-end) node. In the first embodiment, LSP setup (MPLS TE-LSP setup) using RSVP (RFC3209) "RSVP-TE: Extensions to RSVP for LSP Tunnels" in MPLS Traffic Engineering (MPLS TE) for setting up a path (LSP) by an end-to-end scheme, is applied as the signaling for setting up the working path, the protection path and the monitoring path. Note that RSVP (Resource Reservation Protocol) as a basic protocol is defined in RFC2205.

In the MPLS TE-LSP setup, a PATH message defined as a path setup request message is sent from the originating point (head-end) node toward a terminating point (tail-end) node of the path. The PATH message reaches the tail-end node via the nodes through which the path extends. The tail-end node sends an RESV message as a response message to the path setup request message toward the head-end node. The RESV message reaches the head-end node via the nodes through which the path extends.

The PATH message contains a bandwidth value allocated to the path. The node receiving the PATH message ensures (reserves) the bandwidth for the path in the nodes and the links according to the bandwidth value in the PATH message. Further, the PATH message contains a function as a label assignment request message and is stored with pieces of information about the nodes and the links (interfaces) via which the path passes.

The RESV message is stored with the information of the bandwidth reserved in each node. Moreover, the RESV message contains a function as a label assignment notification message, and is stored with a label value (input label value) corresponding to the path in each node.

Each node stores the relay label table 15 with the label value contained in the RESV message as an output label value for forwarding data packets to a next node (next hop) on the path. With this scheme, the relay label table 15 of each of the nodes on the path is stored with the destination (the tail-end node) of the path and with the input label value and the output label value associated with this path (however, only the output label value is stored in the head-end node, and only the input label value is stored in the tail-end node).

Through the procedures described above, the path is set up (established) on the network. When the data receiving unit 13 of the head-end node receives the data packet (IP packet) that should be forwarded across the path (LSP tunnel), the data relay unit 14 refers to the relay label table 15 and attaches the label (the output label value) (label push) to the IP packet. The data transmitting unit 16 forwards the label-attached (label-pushed) IP packet to the next hop node (the relay node) via the link (interface) on the path according to the label value.

In the relay node, the data relay unit 14 acquires the label value attached to the IP packet, and, with this label value being used as an input label value, retrieves the label table 15 for an output label value associated with this input label value. The data relay unit 14 rewrites (exchanges) the label value attached to the IP packet with the retrieved output label value (label swap).

Thus, in the relay node, the output label value associated with the input label value is retrieved, and the label swapping (the exchange of the label) of the IP packet is executed. Thereafter, the IP packet having the swapped label value (output label) is forwarded to the next hop node from the interface associated with the output label.

When the IP packet is received by the tail-end node, the label is removed from the IP packet (label pop). Thereafter, the IP packet is forwarded according to the IP address. Thus, on the path, the data packet is forwarded not based on the IP address but based on the label.

<<PATH Message>>

Figure 13:
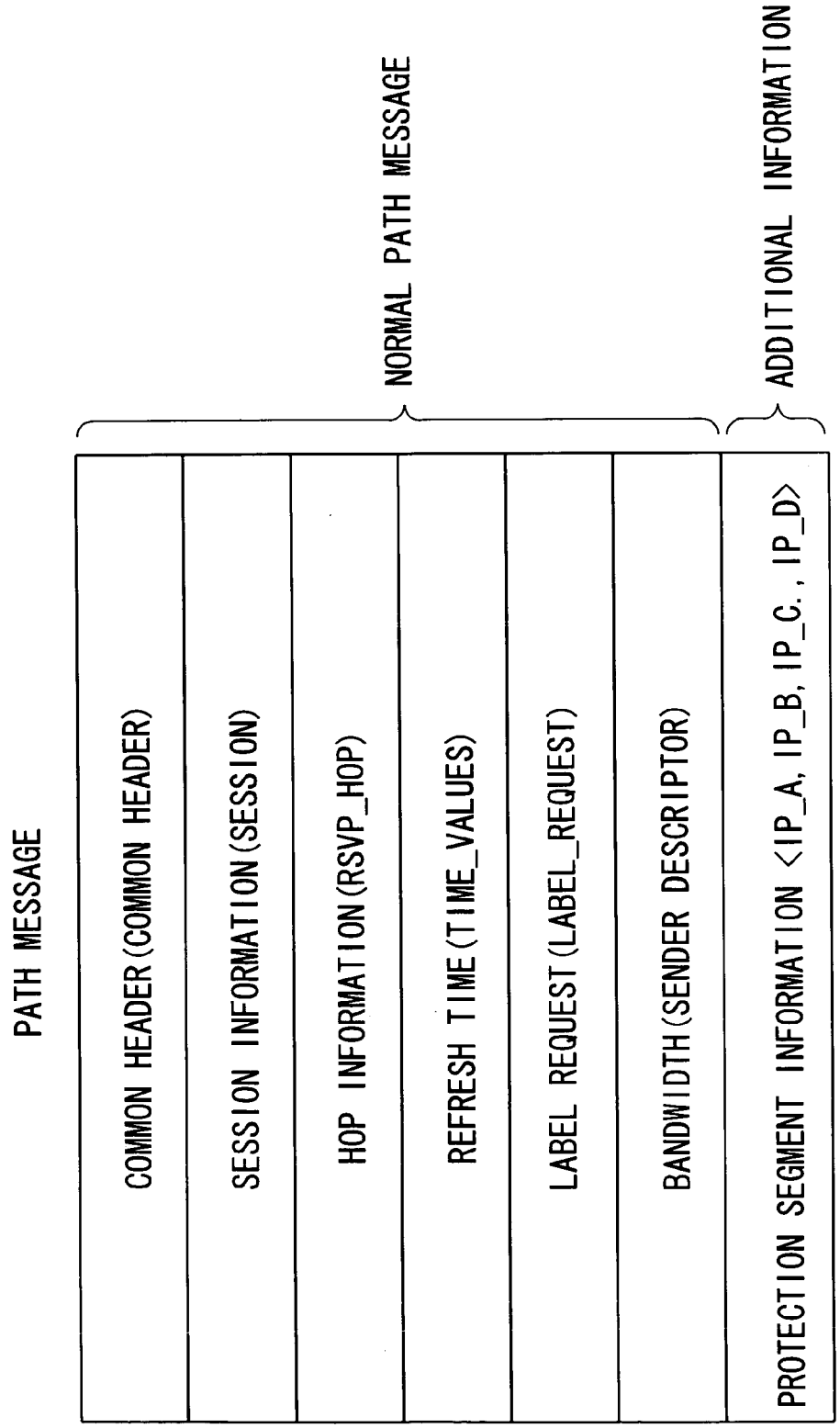
FIG. 13 is a diagram showing a format of a signaling message (PATH message) sent from the head-end node when signaling for the protection path.

FIG. 13 is a diagram showing a format of the PATH message (path message) used for the signaling of the protection path, which is applied to the operational example 2. In FIG. 13, the PATH message contains a common header, session information, hop information, refresh time, a label request and a bandwidth to be reserved (bandwidth information). These items of information are information normally contained in the PATH message.

In the embodiment, in order to enable the automatic bandwidth sharing computation in each relay node on the protection path, the PATH message further contains protection segment information as additional information. Namely, the PATH message is provided with an extension field for storing the protection segment information.

<<Bandwidth Check in all Protection Path Passing Nodes>>

Figure 14:
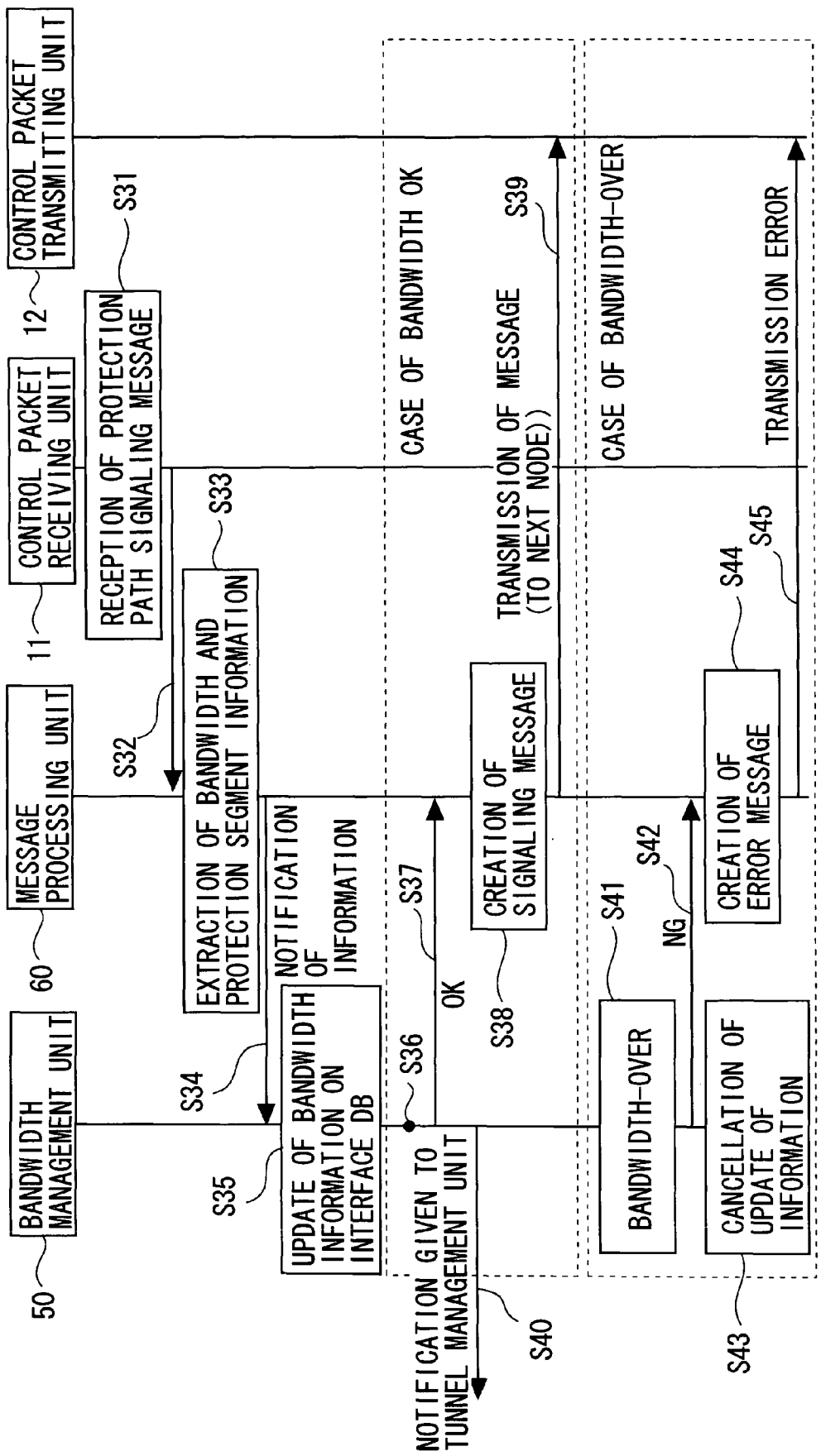
FIG. 14 is a sequence diagram showing the bandwidth check in a relay node) of the protection path in an operational example 2.

FIG. 14 is a sequence diagram showing a bandwidth check process executed by each of the nodes that the protection path passes. As discussed in the operational example 1, when the protection path setup command (the setup command of the protection path 1) is inputted to the head-end node, a signaling message for the protection path 1 is sent from the head-end node (PLR: which is herein the node A) of the protection path.

Namely, in step S13 shown in FIG. 5, the message processing unit 60 generates the PATH message (FIG. 7) for setting up the protection path 1. The PATH message is contained in a control packet, and the message-contained control packet is transmitted from the control packet transmitting unit 12 to the node K corresponding to a next hop node toward a destination that is the node D as the tail-end node.

The relay nodes (the nodes K, L and D in this example) on the protection path are sequentially notified of the signaling message (the PATH message) as far as an error does not occur. The signaling message contains, as shown in FIG. 7, the bandwidth information (which is herein 30 Mbps) and the protection segment information (IP_A-IP_B-IP_C-IP_D).

In FIG. 14, in each of the relay nodes, the control packet receiving unit 11 receives the signaling message for the protection path (S31). The signaling message is supplied to the message processing unit 60 (S32).

The message processing unit 60 extracts the bandwidth information and the protection segment information of the protection path from the signaling message (S33), and notifies the bandwidth management unit 50 of these items of information (S34). The bandwidth management unit 50 updates, in the same way as in the operational example 1, the information on the interface DB 51 matching with the protection path (S35: the same process as S10 in FIG. 5). Further, the bandwidth management unit 50 performs the bandwidth check (S36: the same process as S11 in FIG. 5, see FIG. 6).

As a result of the bandwidth check, if the total value of the bandwidths does not exceed an upper limit of the usable bandwidth, the bandwidth management unit 50 informs the message processing unit 60 of a check result "OK" (S37). The message processing unit 60 generates the signaling message (the PATH message) (S38), and transmits the message to the next hop node through the control packet transmitting unit 12 (S39).

The bandwidth management unit 50 notifies the tunnel management unit 40 of the information about the protection path 1 (S40). The tunnel management unit 40 registers the information about the protection path 1 in the protection path information table 45. Note that the relay node executes, based on the signaling message, a process (such as registering the destination (the tail-end node) in the relay label table 15) needed for setting up the protection path.

While on the other hand, as a result of the bandwidth check, if the total value of the bandwidths exceeds the upper limit (S41), the bandwidth management unit 50 informs the message processing unit 60 of a check result "NG" (S42). Further, the bandwidth management unit 50 cancels the update of the information, which has been done on the interface DB 51 (S43).

The message processing unit 60, upon receiving the check result "NG" from the bandwidth management unit 50, generates an error message (S44), and supplies the error message to the control packet transmitting unit 12 (S45). Te control packet transmitting unit 12 sends the error message toward the head-end node. The sequence described above is executed in each of the relay nodes receiving the signaling message (the PATH message).

According to the operational example 2, the bandwidth information and the protection segment information are contained in the signaling message (the PATH message) for the protection path. Each of the nodes receiving the signaling message judges, by use of the bandwidth information and the protection segment information contained in this message, whether the maximum value in the total values of the bandwidths of the protection path exceeds the usable bandwidth or not. At this time, if the maximum value exceeds the usable bandwidth, an error is outputted, with the result that the protection path is not established (the signaling is halted).

According to the operational example 2, each of the relay nodes and the tail-end node are notified of, by the signaling message, the protection segment information inputted as a command by the head-end node and the bandwidth information computed by the head-end node as the protection segment information and the bandwidth information needed for performing the bandwidth check.

It is therefore possible to execute the computation and the check of the requested bandwidths related to the plurality of protection paths in a way that takes account of sharing the resources (the nodes and the links) without effecting any special setting (inputting of the command) in the relay nodes on the protection path and the tail-end node thereof.

Operational Example 3

Next, an operation of how the head-end node (PLR) of the protection path sets up the protection path in the case of designating none of the protection segment, will be explained by way of an operational example 3. Without even designating the protection segment when inputting a command to the head-end node, it is feasible to search for the protectable working path and to associate this working path with the protection path.

Figure 15:
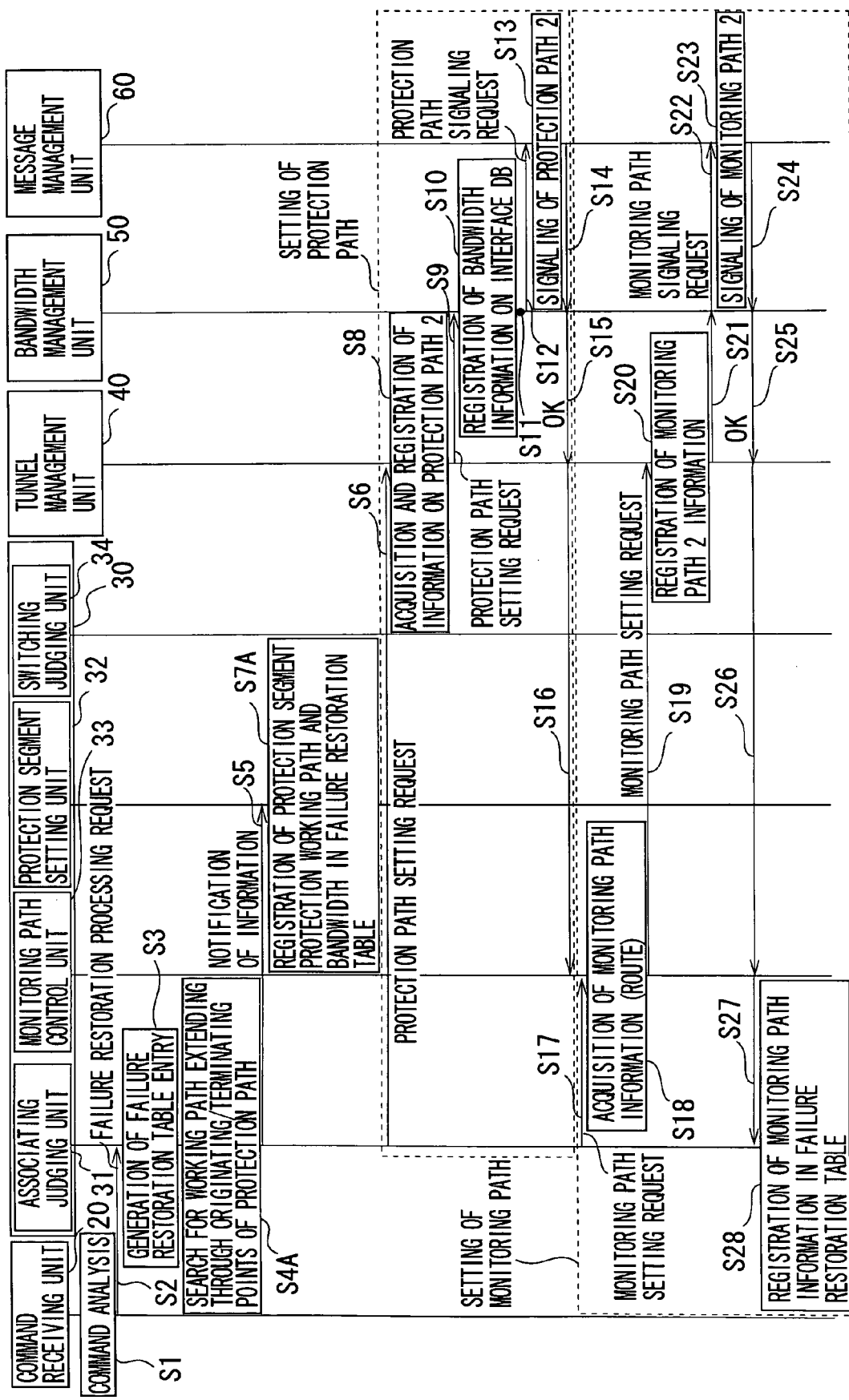
FIG. 15 is a sequence diagram showing a process in the head-end node of the protection path in an operational example 3.

FIG. 15 is a sequence diagram showing an operation of the head-end node in relation to the setup of the protection path in the operational example 3. In FIG. 15, the same processes as those in the operational example 1 shown in FIG. 5 are marked with the same step numerals.

The operational example 3 is based on the assumption of a case of setting up, for instance, subsequently to the establishment of the protection path 1 explained in the operational examples 1 and 2, a new protection path 2 (route: nodes H→K→L→J) without designating the protection segment.

In this case, a protection path setup command is inputted to the node H corresponding to the head-end node of the protection path 2. At this time, unlike the operational example 1, only a route (IP_H-IP_K-IP_L-IP_J) is inputted as a parameter.

The command receiving unit 20 analyzes the command, and recognizes that the command is the protection path setup command (S1). Then, the command receiving unit 20 gives notification of a failure restoration processing request containing the information (the protection path route) to the associating judging unit 31 of the failure restoration processing unit 30 (S2).

The associating judging unit 31 executes a process based on the flowchart in FIG. 6. Specifically, the associating judging unit 31 creates a new entry in the failure restoration table 35, and registers a protection path ID (the protection path 2) (S3). Further, the associating judging unit 31 refers to the working path information table 44 and retrieves a working path associated with this protection path (S4A).

At this time, the associating judging unit 31, the protection segment not being designated (FIG. 6; S03-NO), retrieves, from the working path information table 44, a working path ID of the working path of which a route passes through the head-end (IP_H) and the tail-end (IP_J) of the protection path but does not overlap with the protection path, and the route and the bandwidth of this working path (FIG. 6; S05).

Herein, the working path ID, the route and the bandwidth of the working path 2 are acquired. The associating judging unit 31 notifies the protection segment setting unit 32 of the protection path ID, the protection path route, the working path ID, and the route and the bandwidth of the working path (S5). The associating judging unit 31 notifies the tunnel management unit 40 of a protection path setup request (notification parameters: the protection path ID, and the protection path route) (S6).

The protection segment setting unit 32, in the following manner, acquires and registers the protection segment, the working path to be protected and the bandwidth in the failure restoration table 35 (S7A: FIG. 7). Namely, the protection segment setting unit 32, since the protection segment not being designated, determines the protection segment. The protection segment setting unit 32 extracts a segment (IP_H-IP_I-IP_J) extending between (delimited by) the head-end node (IP_H) and the tail-end node (IP_J) of the protection path 2 from the route information (IP_X2-IP_H-IP_I-IP_J-IP_Z2: see FIG. 3B) of the working path 2, and determines the extracted segment as the protection segment (FIG. 7; S13).

Further, the protection segment setting unit 32 determines, as a usage bandwidth of the protection path, 20 Mbps defined as a usage bandwidth of the working path 2. Moreover, the protection segment setting unit 32 registers, as the information of the protection path 2, the protection segment, the working path ID (the working path 2) to be protected and the usage bandwidth (20 Mbps) (an entry 3; not illustrated). Thus, the information of the protection path 2 and the information of the working path protected by the protection path 2 are registered in the failure restoration table 35. Hereafter, the same processes in steps S8-S28 as those in the operational example 1 are executed.

To be specific, the tunnel management unit 40 (the protection path management unit 42), by using, as a search key, the protection path ID, acquires the information (the bandwidth information and the protection segment information) of the protection path 2 from the failure restoration table 35. The tunnel management unit 40 newly registers, as the protection path information, the protection path ID, the route information and the bandwidth information in the protection path information table 45 (FIG. 3C) (S8). The tunnel management unit 40 notifies the bandwidth management unit 50 of a protection path setup request (notification parameters: the protection path ID, the route, the bandwidth and the protection segment) (S9).

The bandwidth management unit 50 registers, as the interface information about an interface that the protection path 2 passes, a protection path ID, protection nodes, protection links and required bandwidths on the interface DB 51 matching with the protection path 2 (S10). Moreover, the bandwidth management unit 50 computes a bandwidth required for establishing the protection path 2, and checks whether the required bandwidth can be ensured or not (S11).

Herein, on the assumption that the check result is OK, the message processing unit 60 is notified of the signaling request for the protection path 2. Then, the message processing unit 60 generates a signaling message (the PATH message: FIG. 7) for setting up the protection path 2 (S13). This signaling message is sent from the control packet transmitting unit 12 to the node K corresponding to the next hop node.

The node K executes processes shown in FIG. 8 about the signaling message received from the node H. To be specific, as shown in FIG. 8, the control packet receiving unit 11 of the node K, when receiving the signaling message for the protection path 2 (S31), notifies the message processing unit 60 of this signaling message (S32).

The message processing unit 60 extracts the bandwidth information and the protection segment information from the signaling message, and notifies the bandwidth management unit 50 of these items of information (S34). Then, the bandwidth management unit 50 specifies an interface (which is herein an interface 2: see FIG. 1) matching with the protection segment and refers to the interface DB 51 matching with this interface 2.

FIGS. 16A and 16B are diagrams showing a node failure table 51A and a link failure table 51B stored on the interface DB 51 which the bandwidth management unit 50 of the node K refers to.

The bandwidth management unit 50 updates, based on the bandwidth information and the protection segment information, the data stored on within the interface DB 51 (S35). At a point of time when the bandwidth management unit 50 starts the update process, the tables 51A and 51B are stored with the bandwidths requested of the protection nodes and the protection links included in the protection paths 0 and 1 as items of information related to the protection paths 0 and 1.

Herein, the protection segment of the protection path 2 is "IP_H-IP_I-IP_J". Hence, the bandwidth management unit 50 recognizes that the protection links are "IP_H-IP_I" and "IP_I-IP_J" and the protection node is "IP_I".

The bandwidth management unit 50 creates the entries for the protection nodes and the protection links in the node failure table 51A and the link failure table 51B, respectively. Subsequently, the bandwidth management unit 50 registers 30 Mbps shown as the bandwidth information with respect to the protection nodes and the protection links included in the protection path 2 (newly registered values are underlined). Through this registration, contents stored in the tables 51A and 51B become statuses shown in FIGS. 16A and 16B.

Next, the bandwidth management unit 50 checks whether or not the necessary bandwidths can be ensured (S36). The bandwidth management unit 50 computes a total value of the bandwidths of the protection path that protects the protection links and the protection nodes as the bandwidths (required bandwidths) required of the respective protection links and protection nodes, and registers the total value in each of the tables 51A and 51B.

As stated above, 20 Mbps is registered as the required bandwidth of the protection node and the protection link of the protection path 2. The protection path 2 has neither the protection nodes nor the protection links, which overlap with those of the protection paths 0 and 1. Hence, there is no change in the maximum value (40 Mbps) of the total values of the bandwidths of the protection nodes and the protection links.

Thus, the maximum value of the bandwidths requested on the occasion of setting up the protection path 2 does not exceed a usable bandwidth (50 Mbps), and therefore any deficiency of the bandwidth does not occur due to the setup of the protection path 2. Accordingly, the bandwidth check result becomes "OK" (S37). The processing by the bandwidth management unit 50, which has been described above, is executed according to the flowchart illustrated in FIG. 8.

Thereafter, based on the check result "OK", the signaling message for the protection path 2 is generated by the message processing unit 60 (S38) and is sent to the node L corresponding to the next hop node (S39). Further, the tunnel management unit 40 is notified of the check result "OK" (the information about the protection path 2). Thereafter, the same process (FIG. 14) as by the node K is executed by the node L and the node J corresponding to the relay node or the tail-end node of the protection path 2.

When the protection path 2 is set up by the signaling described above, as shown in FIG. 15, the message processing unit 60 of the node H notifies the associating judging unit 31 of the OK message via the bandwidth management unit 50 and the tunnel management unit 40 (S14, S15, S16).

The associating judging unit 31, in order to set up the monitoring path for the protection segment protected by the protection path 2, notifies the monitoring path control unit 33 of a monitoring path setting request (a notification parameter: protection path ID (protection path 2) (S17).

The monitoring path control unit 33 acquires, based on the protection path ID, protection segment information (i.e., a monitoring path route (IP_H-IP_I-IP_J)) stored in the failure restoration table 35 (S18). The monitoring path control unit 33 generates a monitoring path ID and notifies the tunnel management unit 40 of a monitoring path setup request (notification parameters: the monitoring path ID (the monitoring path 2) and route information (IP_H-IP_I-IP_J) of the monitoring path 2) (S19).

In the tunneling management unit 40, the monitoring path management unit 43 registers the monitoring path information (the monitoring path ID and the route information) in the monitoring path information table 46 (S20). Subsequently, the monitoring path management unit 43 notifies the bandwidth management unit 50 of the monitoring path setup request (the notification parameters: the monitoring path ID (the monitoring path 2) and the route information (IP_H-IP_I-IP_J)) (S21).

The bandwidth management unit 50, without updating the bandwidth information, requests the message processing unit 60 for the signaling to set up the monitoring path 2 (S22). The message processing unit 60 executes the signaling process for the monitoring path 2 (S23). As a result of the signaling, the message processing unit 60 notifies the associating judging unit 31 of the OK message via the bandwidth management unit, the tunnel management unit 40 and the monitoring path control unit 33 (S24, S25, S26, S27).

The associating judging unit 31 registers the monitoring path ID in the failure restoration table 35 (S28). With this registration, the node H, when receiving failure notification given by the monitoring path 2, refers to the information stored in the failure restoration table 35 and can thus determine that the protection segment of the working path 2 is switched over to the protection path 2.

Operational Example 4

Next, an operation of associating the working path and the protection path with each other and an operation of re-computing the bandwidth in such a case that the working path is set up (established) after setting up the protection path, will be described by way of an operational example 4. The operational example 4 includes the same operations as the operations shown in the operational examples 1 through 3, and hence, in the following discussion, there are such portions that the explanations of the same operations are omitted.

Figure 17:
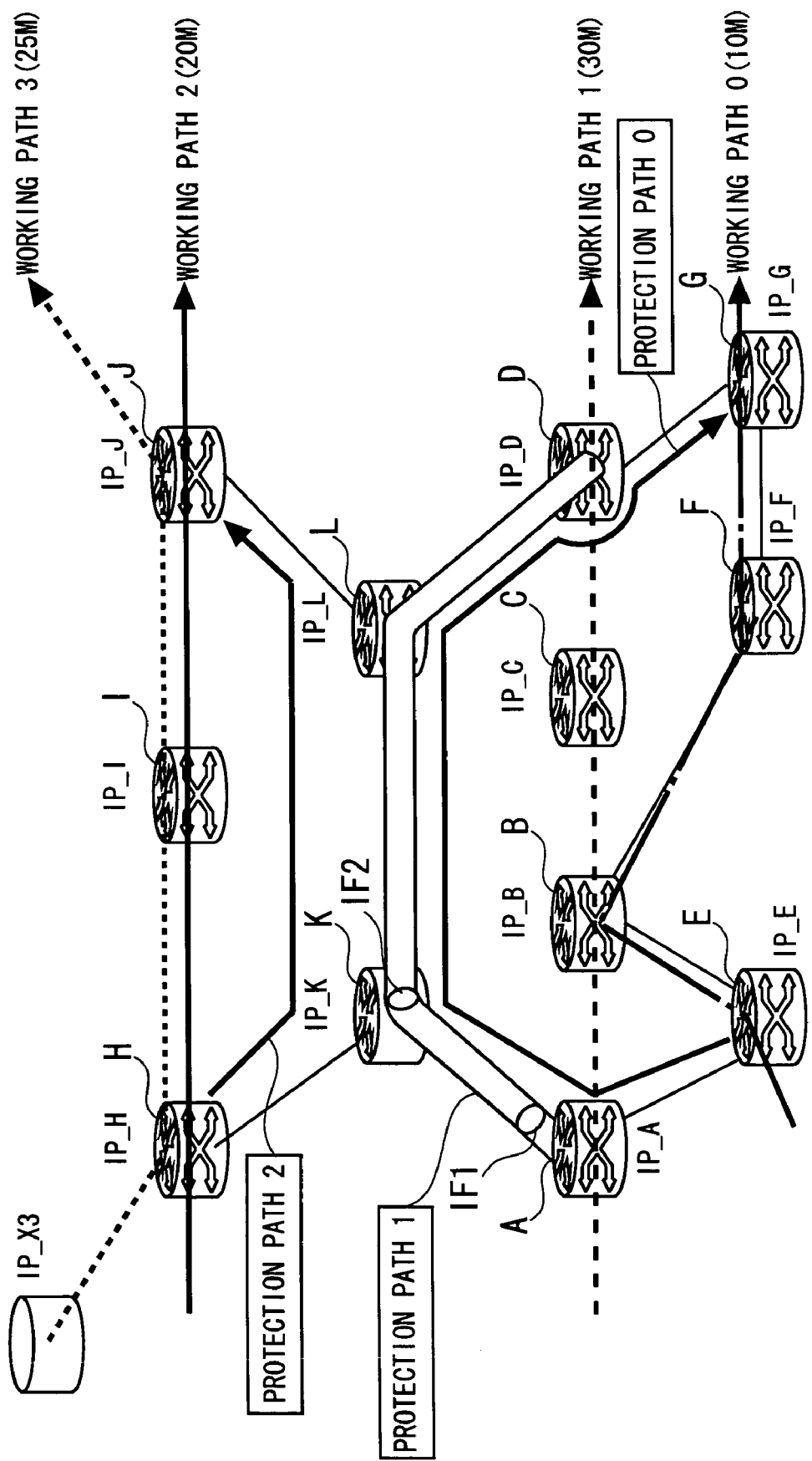
FIG. 17 is a diagram showing the network illustrated in FIG. 1, and showing the working path and the protection path in an operational example 4.
Figure 18:
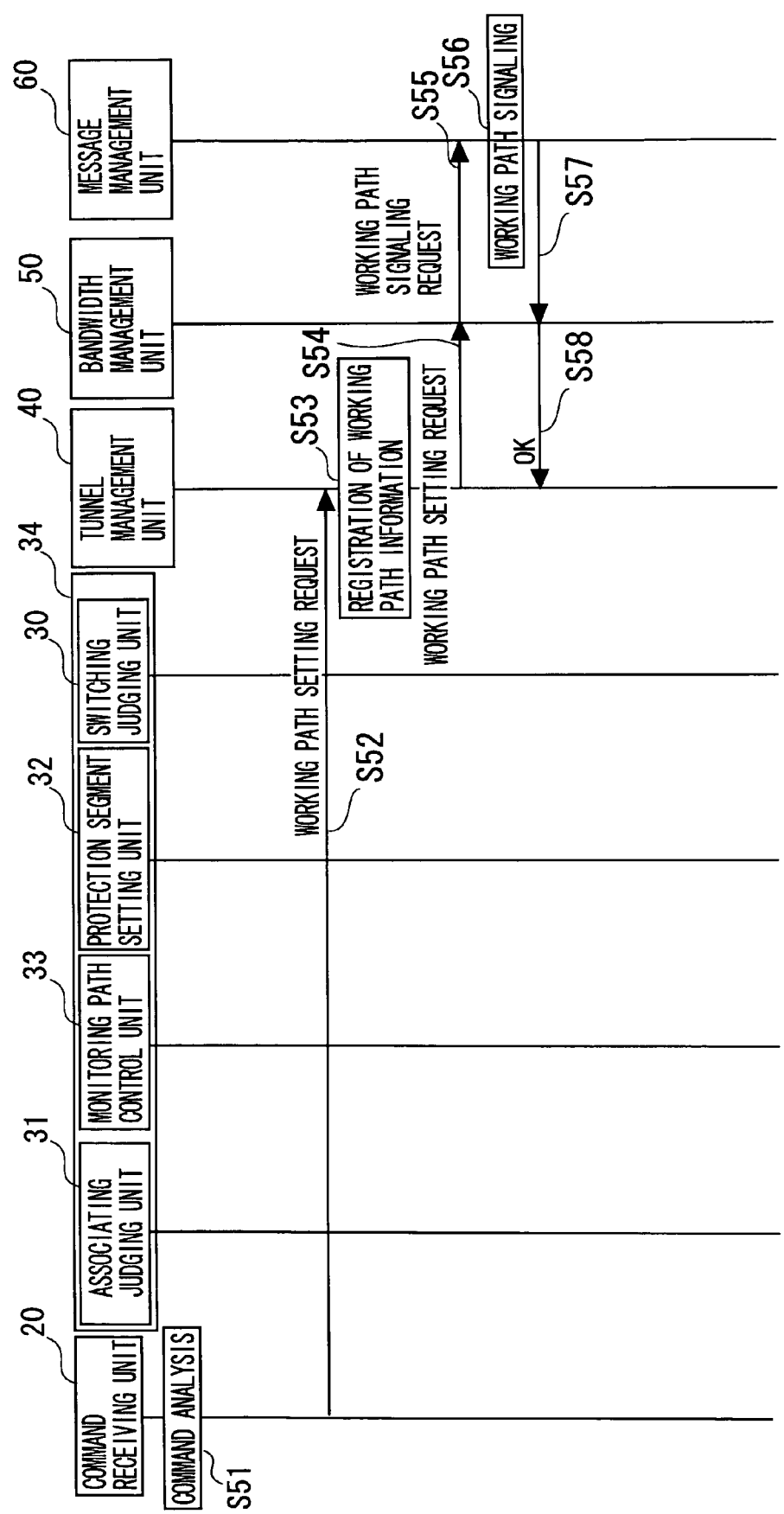
FIG. 18 is a sequence diagram showing a working path setup process by the head-end node of the working path in the operational example 4.
Figure 19A:
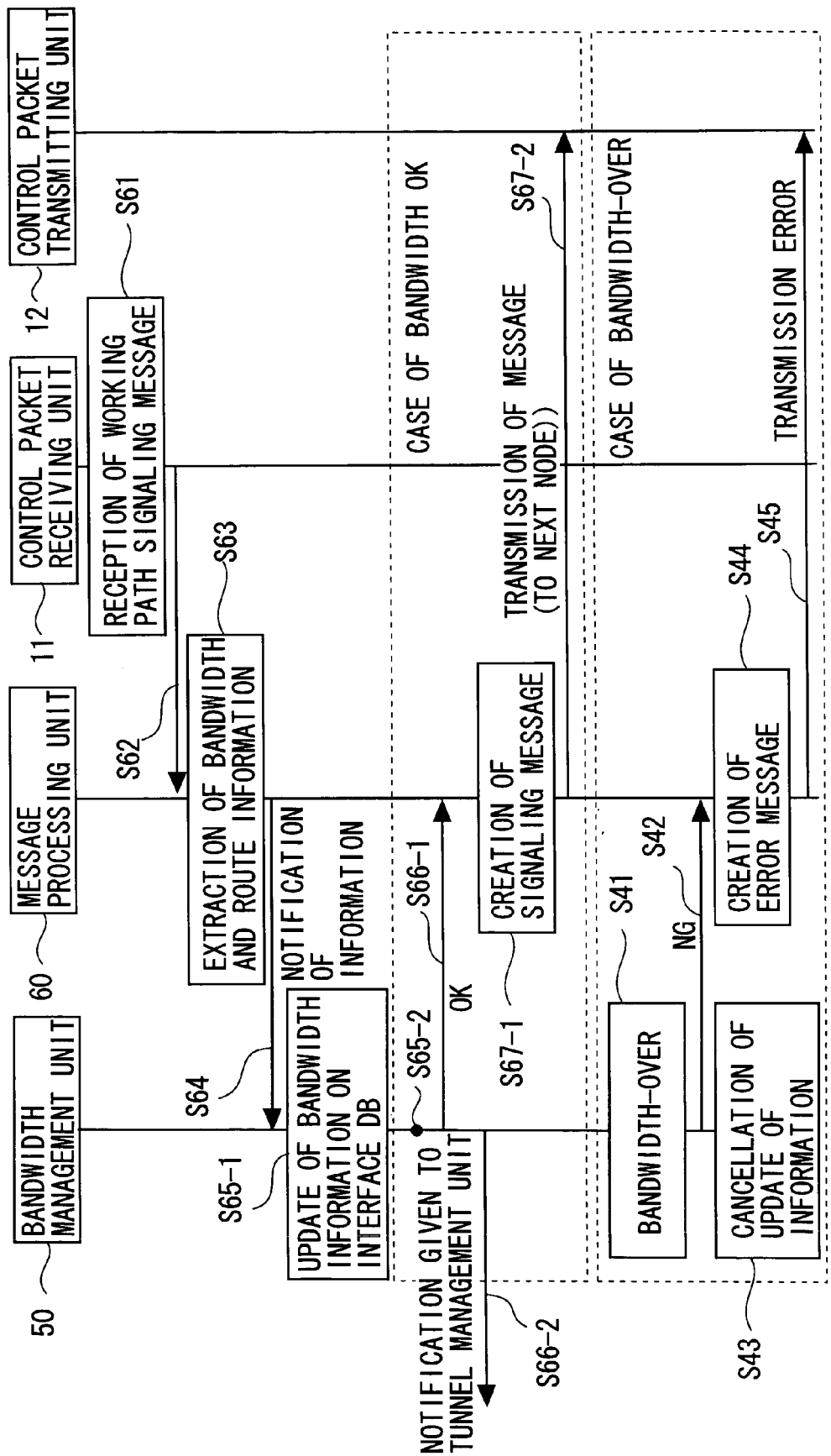
FIG. 19A is a sequence diagram showing processes related to update of protection path information and to setup of the protection path in the head-end node of the protection path with respect to the working path in the operational example 4.
Figure 19B:
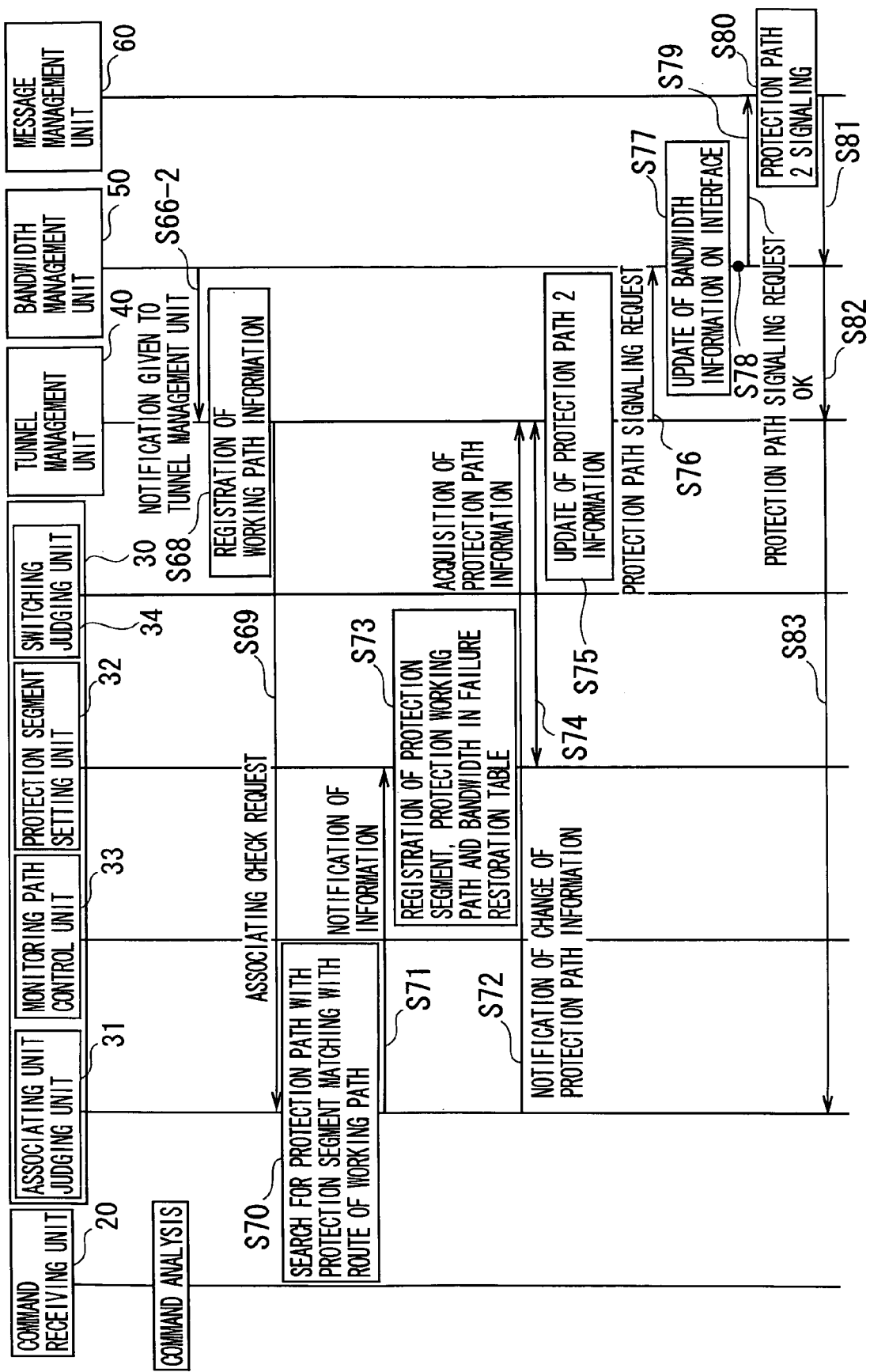
FIG. 19B is a sequence diagram showing the processes related to the update of protection path information and to the setup of the protection path in the head-end node of the protection path with respect to the working path in the operational example 4.

FIG. 17 is a diagram showing how the network is in the operational example 4. FIG. 18 is a sequence diagram showing a process on the head-end node of the working path 3 in the operational example 4. FIGS. 19A and 19B are sequence diagrams showing a process on the head-end node of the protection path protecting the working path 3.

FIG. 20A is a diagram showing contents of the failure restoration table 35 in the operational example 4. FIG. 20B is a diagram showing contents of the working path information (the working path information table 44) in the operational example 4. FIG. 20C is a diagram showing contents of the protection path information (the protection path information table 45) in the operational example 4. FIG. 20D is a diagram showing contents of the monitoring path information (the monitoring path information table 46) in the operational example 4.

FIG. 21A is a diagram showing contents of the node failure table 51A in the operational example 4. FIG. 21B is a diagram showing contents of the link failure table 51B in the operational example 4. FIG. 22 is a flowchart showing a working path associating process by the associating judging unit 31 in the operational example 4.

<<Setup of Working Path>>

The operational example 4 is, as shown in FIG. 17, based on the assumption of such a case that subsequently to the operation in the operational example 3, a new working path 3 (route: IP_X3-IP_H-IP_I-IP_J-IP_Z3, usage bandwidth: 25 Mbps) is set up. FIG. 18 shows a procedure (a process on the head-end node (node IP_X3) of establishing the working path 3. The working path 3 is established by a normal LSP setup procedure.

In FIG. 18, a setup command (input parameters: route and bandwidth) for the working path 3 is inputted to the command receiving unit 20 of the head-end (node IP_X3) of the working path 3. The command receiving unit 20 analyzes the command (S51). The command receiving unit 20, when recognizing that the command is a working path setup request, notifies the tunnel management unit 40 of the request for setting up the working path 3 (S52).

In the tunnel management unit 40, the working path management unit 41 registers the working path information (a working path ID, a route and a bandwidth) in the working path information table 44 (S53). Namely, the working path management unit 41 creates an entry 4 for the working path 3 in the working path information table 44 (FIG. 20B), and registers the working path information of the working path 3 therein. The working path management unit 41 notifies the bandwidth management unit 50 of the request for setting up the working path 3 (S54).

The bandwidth management unit 50 notifies the message processing unit 60 of the request for setting up the working path 3 (S55). The message processing unit 60 effects, based on the setup request, the signaling for setting up the working path 3 (S56). Through this operation, the relay nodes (IP_H, IP_I, IP_J, IP_Z3) of the working path 3 are sequentially notified of the signaling message.

The signaling message contains the information showing the bandwidth of the working path 3 and the route thereof. A format of this signaling message has herein the fields shown as the elements of the normal PATH message in the format illustrated in FIG. 13. Upon establishing the working path 3, the message processing unit 60 notifies the tunnel management unit 40 of the OK message via the bandwidth management unit 50 (S57, S58).

<<Associating for Failure Restoration>>

When the head-end node of the already-established protection path receives the signaling message (the PATH message) for setting up the working path, this node automatically executes the associating process for the failure restoration with respect to the setup target working path.

FIGS. 19A and 19B show a process on the node H receiving the signaling message sent from the node IP_X3. The node H is the head-end node of the protection path 2 explained in the operational example 3.

In FIG. 19A, when the control packet receiving unit 11 of the node H receives the signaling message (S61), the control packet receiving unit 11 supplies the signaling message to the message processing unit 60 (S62).

The message processing unit 60, upon receiving the signaling message, extracts the bandwidth information (S63), and sends this information to the bandwidth management unit 50 (S64) The bandwidth management unit 50 updates the bandwidth information within the interface DB 51 (S65-1). The bandwidth check is executed (S65-2), and, if this check result is OK, the bandwidth management unit 50 sends "OK" back to the message processing unit 60 (S66-1) and also notifies the tunnel management unit 40 of the working path information (the bandwidth, the route) (S66-2). Thereafter, the message processing unit 60 generates the signaling message that should be sent to the next hop node (the node I) (S67-1), and the control packet transmitting unit 12 sends this message to the node I (S67-2). Note that if the bandwidth management unit 50 judges it to be bandwidth-over, the working path is not set up. Namely, the information is not updated while an error message is generated, and the following processes are not executed.

As shown in FIG. 19B, the tunnel management unit 40 receives the notification from the bandwidth management unit 50. In the tunnel management unit 40, the working path management unit 41 creates an entry (entry 4) for the working path 3 in the working path information table 44 (FIG. 20B), and stores a working path ID, a bandwidth and a route of the working path 3 in this entry 4 (S68). Subsequently, the tunnel management unit 40 sends an associating check request (notification parameters: working path ID, route, bandwidth) to the associating judging unit 31 (S69).

The associating judging unit 31 executes processes in steps S70, S71 and S72 according to the check request. FIG. 22 shows the processes by the associating judging unit 31 in steps S70, S71 and S72.

The associating judging unit 31 receives the associating check request (S101). Then, the associating judging unit 31 refers to the failure restoration table 35 (FIG. 20A), and thus searches for such a protection path that the protection segment is coincident with at least part of the route of the working path 3 (S102: S70 in FIG. 19B).

At this time, if there is not the protection path (S103; NO), the associating judging unit 31 finishes the processing. By contrast, if there is the protection path (S103; YES), the associating judging unit 31 notifies the protection segment setting unit 32 of items of information (a protection path ID, a protection segment, a working path ID, a bandwidth) (S104: S71 in FIG. 19B).

Next, the associating judging unit 31 notifies the tunnel management unit 4 of a request for changing the protection path information (S105: S72 in FIG. 19B). Subsequently, the associating judging unit 31 judges whether or not there is a monitoring path for monitoring the protection segment of the working path 3 (S106)

At this time, if the monitoring path exists (S106; YES), the associating judging unit 31 terminates the processing. Whereas if there is not the monitoring path (S106; NO), the associating judging unit 31 notifies the monitoring path control unit 33 of a monitoring path setup request (a notification parameter: protection path ID) (S107), and finishes the processing in FIG. 22. It is to be noted that in the operational example 4, the monitoring path for the protection segment of the working path 3 has been set up in the operational example 3. Therefore, the setup of the monitoring path is not conducted.

Referring back to FIG. 19B, the protection segment setting unit 32 updates, based on the notification given from the associating judging unit 31, the information registered in the failure restoration table 35 (FIG. 20A) (S73). Specifically, the protection segment setting unit 32 refers to the entry 3 in the failure restoration table 35 on the basis of the protection path ID of the protection path 2. Next, the protection segment setting unit 32 additionally registers, in the entry 3, the working path 3 as a working path to be protected by the protection path 2. Further, the protection segment setting unit 32 rewrites the usage bandwidth in the entry 3 from "20 Mbps" into "45 Mbps (a total value of the bandwidths of the working paths 2 and 3)".

On the other hand, the tunnel management unit 40 (e.g., the protection path management unit 45) executes the following processes according to the change request given from the associating judging unit 31. To be specific, the tunnel management unit 40, when receiving the change request, acquires the protection path information (the protection path ID (the protection path 3), and the bandwidth (45 Mbps): registered in the failure restoration table 35) from the protection segment setting unit 32 (S74).

Subsequently, the tunnel management unit 40 refers, based on the protection path ID (the protection path 2), to the entry 3 in the protection path information table 45 (FIG. 20C). At this time, the tunnel management unit 40 rewrites the bandwidth information in the entry 3 into "45 Mbps (a total value of the bandwidths of the actively paths 2 and 3)" (S75). Thereafter, the tunnel management unit 40 sends, to the bandwidth management unit 50, a protection path signaling request (notification parameters: protection path ID, route, bandwidth, protection segment) (S76).

The bandwidth management unit 50 executes, based on the protection path signaling request, the processes according to the flowchart shown in FIG. 8. The bandwidth management unit 50 refers to the interface DB 51 matching with the route of the working path 2.

Herein, the bandwidth management unit 50 refers to the interface DB 51 matching with an interface 2 (FIG. 17) from which the data packet is forwarded to the node L corresponding to the next hop node with respect to the protection path 2. The bandwidth management unit 50 executes a process of updating, based on the notification parameters, the tables 51A and 51B (FIGS. 21A and 21B) within the interface DB 51 (S76).

Herein, the bandwidth management unit 50 infers, based on the protection segment in the parameters, the protection nodes and the protection links of the protection path 2. Subsequently, the bandwidth management unit 50 registers the bandwidth (45 Mbps) of the protection path 2 in the entries of the inferred protection nodes and protection links.

At this time, "20 Mbps" registered in the operational example 3 is registered in the entries of the associated protection nodes and protection links. Hence, the bandwidth management unit 50 rewrites this bandwidth "20 Mbps" into "45 Mbps". In FIGS. 21A and 21B, the updated values are underlined.

Next, the bandwidth management unit 50 performs the bandwidth check about the protection path 2 (S78). The bandwidth management unit 50, with respect to the entries of the updated protection nodes and protection links, updates a total value of the bandwidths requested of the protection nodes and the protection links. Herein, as for the table 51A, the total value of the bandwidth(s) of the protection node IP_I is computed 45 Mbps, and the maximum value in the total values is rewritten into 45 Mbps. On the other hand, as for the table 51B, a total value of the bandwidths of the protection links IP_H-IP_I and IP_I-IP_J is computed 45 Mbps, and the maximum value in the total values is rewritten into 45 Mbps.

The bandwidth management unit 50 compares the maximum value "45 Mbps" with an upper limit "50 Mbps" of the bandwidths for the protection path that is set in the interface 2. The maximum value is smaller than the upper limit, and hence, even when the protection segment is switched over to the protection path 2 in case a failure occurs in the protection segment, the bandwidth requested of the protection path 2 can be ensured. Accordingly, the bandwidth, management unit 50 judges that the bandwidth check result is OK.

The bandwidth management unit 50 requests the message processing unit 60 for the signaling for the protection path 2 (S79) The message processing unit 60 performs, about the protection path 2, the signaling with a new bandwidth (S80). When a new protection path 2 is established by the signaling, the message processing unit 60 notifies the associating judging unit 31 of the OK message via the bandwidth management unit 50 and the tunnel management unit 40 (S81, S82, S83).

In the signaling, a PATH message shown in FIG. 13 is sent, and the via-node (the node L) of the protection path 2 executes, based of the PATH message, a sequence in FIG. 14 and a process (a bandwidth check) shown in FIG. 8. At this time, if the request bandwidth "45 Mbps" can be ensured, the signaling continues, and the protection path 2 having the new bandwidth ensured is established.

In the operational examples 1 through 4 described above, the nodes A and the node H serving as the head-end nodes of the respective protection paths 1, 2 are capable of detecting a failure (a node failure and/or a link failure) in the protection segment to be monitored by the monitoring path in a way that detects a failure in the monitoring path. This type of detection is conducted by the failure restoration processing unit 30.

In this case, the switching judging unit 34 of the failure restoration processing unit 30 refers to, for instance, the associated entry in the failure restoration table 35 by use of the monitoring path ID of the monitoring path with the failure detected, thereby searching for a working path having the protection segment with the failure occurred and for a protection path to which this working path is switched over. Then, the switching judging unit 34 determines that the route of the protection segment is switched over to the retrieved protection path. In accordance with this determination, the each of the nodes on the protection path executes the switching process.

Operational Effect of Embodiment

Firstly, in the embodiment of the invention, when setting up the protection path, the protection segment (expressed by e.g., the enumeration of the node IDs) protected by the protection path is designated or determined. The path message (the signaling message) for the protection path contains the protection segment and the total value (the bandwidth requested of the setup target protection path: protection request bandwidth) of the usage bandwidths of one or more working paths including this protection segment.

Each of the relay nodes of the setup target protection path can know the protection segment and the protection required bandwidth on the protection path-by-protection path basis from the path message for the protection path. Each of the nodes (the head-end node and the relay nodes) on the protection path retains, based on the protection segment and the protection required bandwidth, the protection nodes, the protection links and the protection bandwidths, which are associated with the respective protection paths, on the interface DB 51 in a way that associates these items of information with the interfaces possessed by the respective nodes.

Further, each node computes, based on the information retained on the interface DB 51, the necessary bandwidths (the total values) about all the protection paths in consideration of the bandwidths sharable among the protection paths on an interface-by-interface basis, and actually allocates the maximum value in the total values to the interface.

With this contrivance, if the condition of the working path protected by the protection path changes (if the bandwidth changes or the working path is added or deleted), and if the protection paths themselves increase or decrease due to a partial addition or cancellation of the setup of the failure restoration, the information can be quickly updated. As a result, the shared bandwidths can be re-computed promptly Secondly, in the embodiment of the invention, when the protection path is set up by inputting the command, the protection segment can be designated. The node, to which the protection path setup command is inputted, can recognize that this protection path is to be employed in case a failure occurs in the designated protection segment. Therefore, the automatic execution of the signaling for setting up the monitoring path is triggered by inputting the command. With this operation, the monitoring path for monitoring the protection segment is automatically established.

Furthermore, in a case where the protection segment is not particularly designated when the protection path is set up by inputting the command, the node receiving the input of the protection path setup command, by the process as exemplified in the operational example 3, can determine the protection segment. According to the necessity, the monitoring path for the determined protection segment is automatically set up. If there are a plurality of working paths with respect to the different protection segments, a plurality of monitoring paths are automatically set up. With this scheme, a labor for setting up the monitoring paths can be saved. Moreover, a mistake in setting up the monitoring path route can be restrained.

Thirdly, in the embodiment of the invention, when the protection path is set up by inputting the command, if the protection segment is designated, the node (the head-end node of the protection path) receiving the input of the command retrieves the working path passing the protection segment. At this time, if the working path exists, the path associating process is automatically done. Further, whereas if the protection segment is not designated, the working path including the head-end and the tail-end of the protection path in the route, is retrieved. If the working path exists, the path associating process is done. With this operation, the process of associating the working path and the protection path with each other can be automatically executed, whereby the setup labor can be saved.

Fourthly, in the embodiment of the invention, when the working path is set up, each of the relay nodes of the working path searches for such a protection path that the route of this working path is coincident with the protection segment, or such a protection path that the tail-end exists on the route of the working path but the protection segment is not designated (the head-end node of the protection path is the self-node). If there is the protection path satisfying the conditions, the path associating process is automatically done. With this operation, the process of associating the working path and the protection path with each other can be automatically executed, whereby the setup labor can be saved.

According to the embodiment, the operator can set the variety of failure restorations simply by setting up the protection paths. Specifically, there are the following advantages.

(1) The associating judging unit can automatically determine the working path to be protected by the protection path, and can automatically set up the monitoring of the failure (i.e., the generation of the monitoring path).

(2) The protection segment setting unit can compute the necessary bandwidth for every protection path by use of the protection segment information and the information of the working path to be protected.

(3) The bandwidth management unit can determine and set, while taking the sharing aspect into consideration, the bandwidth needed for each interface on the basis of the protection path bandwidth information and the protection segment information without performing the complicated setting as by the SRLG.

(4) The protection segment setting unit can, even when the protection segment information is not designated, automatically determine the protection segment from the information about the working path and the protection path.

(5) Each of the relay nodes of the protection path, with the protection segment being contained in the protection path message, interprets (analyzes) this message and can always, while taking account of the sharing aspect, compute and set the bandwidth needed for the interface without performing the complicated setting as by the SRLG.

<Others>

The disclosures of Japanese patent application No. JP2005-233671 filed on Aug. 11, 2005 including the specification, drawings and abstract are incorporated herein by reference.

What is claimed is:

1. A connection-oriented network node being designated as an originating node of a protection path serving as a bypath of a protection segment included in a working path in a network system in which data is transferred via a path previously established between nodes, the network node comprising:

a memory configured:
  to be stored with information about a working path passing the network node itself;
  to be stored with such information that a protection path is associated with the working path having a protection segment to be protected by this protection path; and
  to be stored with, per protection path, required bandwidths of nodes and links protected by the protection path with respect to an interface transmitting data that is forwarded on the protection path; and a processor configured:
  to retrieve information of one or more working paths including a protection segment protected by a setup target protection path to be set up based on a setting up command of the protection path from the memory;
  to register, in the memory, the retrieved working paths information and the setup target protection path information that contains the protection segment and a usage bandwidth in a way that associates the retrieved working paths information with the setup target protection path information;
  to record, with respect to protection nodes and protection links included in the protection segment protected by the setup target protection path, usage bandwidths of the setup target protection path in the memory;
  to calculate a total value of the usage bandwidths of each protection path related to the protection nodes and protection links, which are registered in the memory;
  to judge whether or not a maximum value in the calculated total value exceeds a usable bandwidth for the protection path that is being preset with respect to the interface; and
  to generate, when it is judged that the maximum value does not exceed the usable bandwidth, a signaling message for setting up the setup target protection path to notify of this message each of the nodes located on the setup target protection path, the processor generating a signaling message containing a usage bandwidth of the setup target protection path and the protection segment protected by the setup target protection path in order for each of relay nodes on the setup target protection path that receives the signaling message for the setup target protection path to judge whether or not the usage bandwidth of the protection path in the interface of the relay node itself, which corresponds to the setup target protection path, exceeds a usable bandwidth for the protection path that is being preset to the interface by the setup of the setup target protection path.

2. The connection-oriented network node according to claim 1, wherein the processor, if the protection segment of the setup target protection path is designated by the command, retrieves the information of all the working paths each having a route including this protection segment from the memory.

3. The connection-oriented network node according to claim 1, wherein the processor, if the protection segment of the setup target protection path is not designated by the command, retrieves information of the working path passing an originating node and a terminating node of the setup target protection path and having a route that does not overlap with the protection path from the memory, and determines, as the protection segment, a segment on a route of the retrieved working path, which exists between the originating node and the terminating node of the setup target protection path.

4. The connection-oriented network node according to claim 1, wherein the processor retrieves a total value of usage bandwidths of the one or more working paths to determine a usage bandwidth of the setup target protection path.

5. The connection-oriented network node according to claim 1, wherein the processor, if the protection path is set up through sending the signaling message, retrieves the protection segment of the protection path from the memory, and the processor generates a signaling message for setting up a monitoring path corresponding to the retrieved protection segment to notify of the signaling message each of the nodes located on the monitoring path.

6. The connection-oriented network node according to claim 5, wherein the processor registers, when the monitoring path is set up, information of the monitoring path in the memory in a way that associates the monitoring path information with the protection path information and the working path information.

7. The connection-oriented network node according to claim 1, wherein the processor, when receiving the signaling message for setting up the working path passing the network node itself, retrieves a protection path having the protection segment included in a route of the setup target working path that is contained in the signaling message from the memory, and rewrites a usage bandwidth stored on the memory with respect to the retrieved protection path into a value obtained by adding the usage bandwidth of the setup target working path that is contained in the signaling message to the stored usage bandwidth, and the processor generates and sends a signaling message for setting up a protection path having the rewritten usage bandwidth.

8. The connection-oriented network node according to claim 7, wherein the processor, when rewriting the usage bandwidth with respect to the retrieved protection path, updates, by use of the rewritten usage bandwidth, usage bandwidths of a protection node and of a protection link related to the retrieved protection path that are stored in the memory, and judges whether or not the maximum value exceeds the usable bandwidth by the update, and the processor, when judging that the maximum value does not exceed the usable bandwidth, generates and sends a signaling message for setting up the protection path having the rewritten usage bandwidth.

9. A connection-oriented network node receiving a signaling message for setting up a protection path serving as a bypath of a protection segment included in a working path in a network system in which data is transferred via a path previously established between nodes, the network node comprising:

a memory to be stored with, per protection path, usage bandwidths of the protection path for each of protection nodes and each of protection links that are protected by the protection path with respect to an interface transmitting data that is forwarded on the protection path;

processor configured:

to receive the signaling message for setting up a protection path, the signaling message including a usage bandwidth of a setup target protection path and a protection segment protected by the setup target protection path;

to extract the usage bandwidth of the setup target protection path and the protection segment from the signaling message;

to register in the memory, the extracted usage bandwidth with respect to the protection node and the protection link included in the extracted protection segment;

to calculate respective total value of the usage bandwidths for the respective protection nodes and the respective protection links that are registered in the interface information storage unit to judge whether or not a maximum value in the calculated total values exceeds a usable bandwidth for the protection path, which is being preset for the interface; and to output, when the maximum value exceeds the usable bandwidth, an error in a signaling for setting up the setup target protection path.

10. A connection-oriented network node being designated as an originating node of a protection path serving as a bypath of a protection segment included in a working path in a network system in which data is transferred via a path previously set up between nodes, the network node comprising:

a processor configured:

to determine, when setting up a setup target protection path, a usage bandwidth of the setup target protection path on the basis of a working path including a protection segment to be protected by the setup target protection path; and to generate, if a value obtained by adding the determined usage bandwidth to a current usage bandwidth of the protection path in an interface transmitting data that is forwarded on the setup target protection path, does not exceed a usable bandwidth for the protection path that is being preset with respect to the interface, a signaling message for setting up the setup target protection path to send the signaling message, the signaling message including the usage bandwidth of the protection path and information for the protection segment, wherein the protection segment formed on the working path is defined by a plurality of nodes, which has at least one relay node, within the protection segment and a plurality of links connecting the plurality of nodes serial, and wherein the information for the protection segment includes identification information of all of the plurality of nodes and identification information of the plurality of links.

11. A connection-oriented network node according to claim 10, wherein the processor, when a setup of a new working path is detected and if a protection path, which an originating node of this protection path is the network node itself, containing a protection segment included in a route of the new working path has already been set up, generates a protection path setup signaling message for adding the usage bandwidth of the new working path to a usage bandwidth of the already-setup protection path.

12. A connection-oriented network node being designated as an originating node of a protection path serving as a bypath of a protection segment included in a working path in a network system in which data is transferred via a path previously established between nodes, the network node comprising:

a processor configured:

to receive a signaling message for setting up a protection path, the signaling message including information for the protection segment protected by a setup target protection path and a usage bandwidth of the setup target protection path, wherein the protection segment formed on the working path is defined by a plurality of nodes, which has at least one relay node, within the protection segment and a plurality of links connecting the plurality of nodes serial, and wherein the information for the protection segment includes identification information of all of the plurality of nodes and identification information of the plurality of links;

to specify, based on the information for the protection segment of the setup target protection path that is contained in the signaling message, an interface transmitting data that is forwarded on the setup target protection path; and to judge whether or not a total value obtained by adding a current protection path usage bandwidth of the specified interface to the usage bandwidth of the setup target protection path that is contained in the signaling message exceeds a usable bandwidth for the protection path that is being preset with respect to the interface to output an error in a signaling for the setup target protection path.

\* \* \* \* \*